(12) United States Patent
Hwang et al.

(10) Patent No.: US 12,407,454 B2
(45) Date of Patent: Sep. 2, 2025

(54) UNLICENSED BAND BY UE IN WIRELESS COMMUNICATION SYSTEM AND APPARATUS THEREFOR

(71) Applicant: LG ELECTRONICS INC., Seoul (KR)

(72) Inventors: Daesung Hwang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 298 days.

(21) Appl. No.: 18/119,985

(22) Filed: Mar. 10, 2023

(65) Prior Publication Data

US 2023/0344565 A1 Oct. 26, 2023

(30) Foreign Application Priority Data

Mar. 30, 2022 (KR) .................. 10-2022-0039894

(51) Int. Cl.
| | |
|---|---|
| *H04L 1/1867* | (2023.01) |
| *H04L 1/1812* | (2023.01) |
| *H04W 72/25* | (2023.01) |
| *H04W 72/40* | (2023.01) |
| *H04W 74/0808* | (2024.01) |
| *H04W 74/0833* | (2024.01) |
| *H04W 92/18* | (2009.01) |

(52) U.S. Cl.
CPC ............ *H04L 1/187* (2013.01); *H04L 1/1887* (2013.01); *H04L 1/1896* (2013.01); *H04W 72/40* (2023.01)

(58) Field of Classification Search
CPC ..... H04L 1/187; H04L 1/1887; H04L 1/1896; H04L 1/1812; H04W 72/25; H04W 72/40; H04W 74/085; H04W 92/18
See application file for complete search history.

(56) References Cited

U.S. PATENT DOCUMENTS

| | | | |
|---|---|---|---|
| 11,723,068 B2 * | 8/2023 | Chae ................. | H04W 72/04 370/329 |
| 11,737,134 B2 * | 8/2023 | Wang ................. | H04L 1/1854 370/329 |
| 2015/0296411 A1 * | 10/2015 | Meyer ................ | H04W 4/46 370/336 |
| 2017/0005768 A1 * | 1/2017 | Yin .................... | H04L 1/1825 |
| 2017/0156161 A1 * | 6/2017 | Kang ................. | H04W 74/085 |
| 2018/0049143 A1 * | 2/2018 | Gupta ............... | H04W 16/14 |
| 2018/0070252 A1 * | 3/2018 | Gupta ............... | H04W 24/08 |
| 2018/0176955 A1 * | 6/2018 | Salem ............... | H04W 74/0808 |
| 2018/0359780 A1 * | 12/2018 | Zhang .............. | H04B 7/0417 |
| 2019/0200386 A1 * | 6/2019 | Yang ................ | H04W 74/0808 |
| 2019/0373639 A1 * | 12/2019 | Elliott ............... | H04W 76/15 |
| 2020/0100284 A1 * | 3/2020 | Li ...................... | H04W 74/002 |
| 2021/0036811 A1 * | 2/2021 | Bhattad ............ | H04L 1/1614 |
| 2021/0051525 A1 | 2/2021 | Cao et al. | |
| 2021/0068153 A1 * | 3/2021 | Seo .................. | H04W 4/40 |

(Continued)

FOREIGN PATENT DOCUMENTS

KR    20210049825 A    5/2021

*Primary Examiner* — Jenee Holland
(74) *Attorney, Agent, or Firm* — BRYAN CAVE LEIGHTON PAISER LLP

(57) ABSTRACT

Disclosed are a method of transmitting, by a first user equipment (UE), sidelink signals in an unlicensed band in a wireless communication system supporting sidelink communication and apparatus therefor.

14 Claims, 19 Drawing Sheets

---

Randomly selecting a value of a backoff counter within the contention window configured for channel access of the unlicensed band — S301

Transmitting a first sidelink signal including TB based on the backoff counter — S303

Retransmitting the TB through a second sidelink signal — S305

(56) References Cited

U.S. PATENT DOCUMENTS

| | | | | |
|---|---|---|---|---|
| 2021/0385831 A1* | 12/2021 | Nogami | .............. | H04W 72/23 |
| 2022/0232625 A1* | 7/2022 | Liu | .................. | H04W 74/0808 |
| 2022/0279584 A1* | 9/2022 | Zhu | ..................... | H04L 1/1887 |
| 2022/0295548 A1* | 9/2022 | Noh | .................. | H04W 74/085 |
| 2022/0312481 A1* | 9/2022 | Talarico | ................ | H04L 1/187 |
| 2022/0353022 A1* | 11/2022 | Murayama | ............ | H04L 1/1861 |
| 2022/0394755 A1* | 12/2022 | Noh | ..................... | H04L 5/0062 |
| 2023/0044594 A1* | 2/2023 | Wang | ................. | H04L 1/1822 |
| 2023/0087110 A1* | 3/2023 | Hu | ..................... | H04W 74/0808 370/329 |
| 2023/0088550 A1* | 3/2023 | Wang | .................. | H04L 1/1822 370/329 |
| 2023/0106442 A1* | 4/2023 | Hu | ..................... | H04W 74/002 370/329 |
| 2023/0180289 A1* | 6/2023 | Cui | ..................... | H04L 5/0055 370/329 |
| 2023/0217486 A1* | 7/2023 | Park | ..................... | H04L 1/1854 370/329 |
| 2023/0254761 A1* | 8/2023 | Noh | ..................... | H04L 5/0051 370/329 |
| 2023/0300886 A1* | 9/2023 | Chen | ................ | H04W 74/0808 370/329 |
| 2023/0309145 A1* | 9/2023 | Chen | ................ | H04W 74/0816 |
| 2023/0344563 A1* | 10/2023 | Huang | ............ | H04W 74/0808 |
| 2024/0049305 A1* | 2/2024 | Noh | .................... | H04W 74/085 |
| 2025/0047614 A1* | 2/2025 | Yu | ..................... | H04W 74/0816 |
| 2025/0133590 A1* | 4/2025 | Tomeba | ............... | H04W 92/18 |

\* cited by examiner (a)

(a)

(b)

(a) Carrier aggregation between L-band and U-band (b) Standalone U-band(s)

UNLICENSED BAND BY UE IN WIRELESS COMMUNICATION SYSTEM AND APPARATUS THEREFOR

This application claims the benefit of Korean Patent Application No. 10-2022-0039894, filed on Mar. 30, 2022, which is hereby incorporated by reference as if fully set forth herein.

BACKGROUND

Technical Field

The present disclosure relates to a method of transmitting a sidelink signal in an unlicensed band by a user equipment (UE) in a wireless communication system and an apparatus therefor.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed.

The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

Accordingly, the present disclosure is directed to a method of transmitting by a user equipment (UE) a sidelink signal in an unlicensed band in a wireless communication system and apparatus therefor that substantially obviates one or more problems due to limitations and disadvantages of the related art.

An object of the present disclosure is to provide a method of ensuring smooth sidelink communication in an unlicensed band by adjusting the size of a contention window operated in the unlicensed band based on characteristics of transport block (TB) retransmission and HARQ feedback related to the sidelink communication and apparatus therefor.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

To achieve these objects and other advantages and in accordance with the purpose of the disclosure, as embodied and broadly described herein, there is provided a method of transmitting, by a first UE, sidelink signals in an unlicensed band in a wireless communication system supporting sidelink communication. The method may include: randomly selecting a value of a back-off counter within a contention window related to the unlicensed band; and transmitting a first sidelink signal including a transport block (TB) in the unlicensed band based on the backoff counter. The first sidelink signal may be transmitted over a physical sidelink shared channel (PSSCH) or a physical sidelink control channel (PSCCH). Based on that reception of hybrid automatic repeat request (HARQ) feedback for the first sidelink signal is not expected, a size of the contention window may be maintained regardless of whether the TB is retransmitted.

Alternatively, based on that only the first sidelink signal for which the HARQ feedback is disabled is transmitted during a first duration, the size of the contention window may be maintained although the TB is retransmitted.

Alternatively, the first duration may be a reference duration corresponding to channel occupancy for the unlicensed band after a last update of the size of the contention window.

Alternatively, the reference duration may be a duration between a start of the channel occupancy and an end of a first slot in which the first sidelink signal is transmitted.

Alternatively, based on that the first sidelink signal for which the reception of the HARQ feedback is not expected has a specific cast type, the size of the contention window may be maintained regardless of whether the TB is retransmitted. The specific cast type may be broadcast or groupcast.

Alternatively, the first UE may be configured to determine whether the reception of the HARQ feedback is expected after a last update of the contention window.

Alternatively, the contention window may be configured for each of priority classes related to channel access in the unlicensed band.

Alternatively, based on that the reception of the HARQ feedback for the first sidelink signal is not expected, the first UE may be configured to maintain the size of the contention window for all of the priority classes.

Alternatively, the size of the contention window may be configured for each packet priority related to the sidelink signals or each resource pool related to the sidelink signals.

In another aspect of the present disclosure, there is provided a first UE configured to transmit sidelink signals in an unlicensed band in a wireless communication system supporting sidelink communication. The first UE may include: a radio frequency (RF) transceiver; and a processor connected to the RF transceiver. The processor may be configured to: randomly select a value of a back-off counter within a contention window related to the unlicensed band; and control the RF transceiver to transmit a first sidelink signal including a TB in the unlicensed band based on the backoff counter. The first sidelink signal may include a PSSCH or a PSCCH. Based on that reception of HARQ feedback for the first sidelink signal is not expected, a size of the contention window may be maintained regardless of whether the TB is retransmitted.

In another aspect of the present disclosure, there is provided a chipset configured to transmit sidelink signals in an unlicensed band in a wireless communication system supporting sidelink communication. The chipset may include: at least one processor; and at least one memory operably connected to the at least one processor and configured to, when executed, cause the at least one processor to perform operations. The operations may include: randomly selecting a value of a back-off counter within a contention window related to the unlicensed band; and transmitting a first sidelink signal including a TB in the unlicensed band based on the backoff counter. The first sidelink signal may include a PSSCH or a PSCCH. Based on that reception of HARQ feedback for the first sidelink signal is not expected, a size of the contention window may be maintained regardless of whether the TB is retransmitted.

In a further aspect of the present disclosure, there is provided a computer-readable storage medium including at least one computer program configured to perform operations of transmitting sidelink signals in an unlicensed band in a wireless communication system supporting sidelink communication. The at least one computer program may be stored on the computer-readable storage medium. The operations may include: randomly selecting a value of a back-off counter within a contention window related to the unlicensed band; and transmitting a first sidelink signal including a TB in the unlicensed band based on the backoff counter. The first sidelink signal may include a PSSCH or a PSCCH. Based on that reception of HARQ feedback for the first sidelink signal is not expected, a size of the contention window may be maintained regardless of whether the TB is retransmitted.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
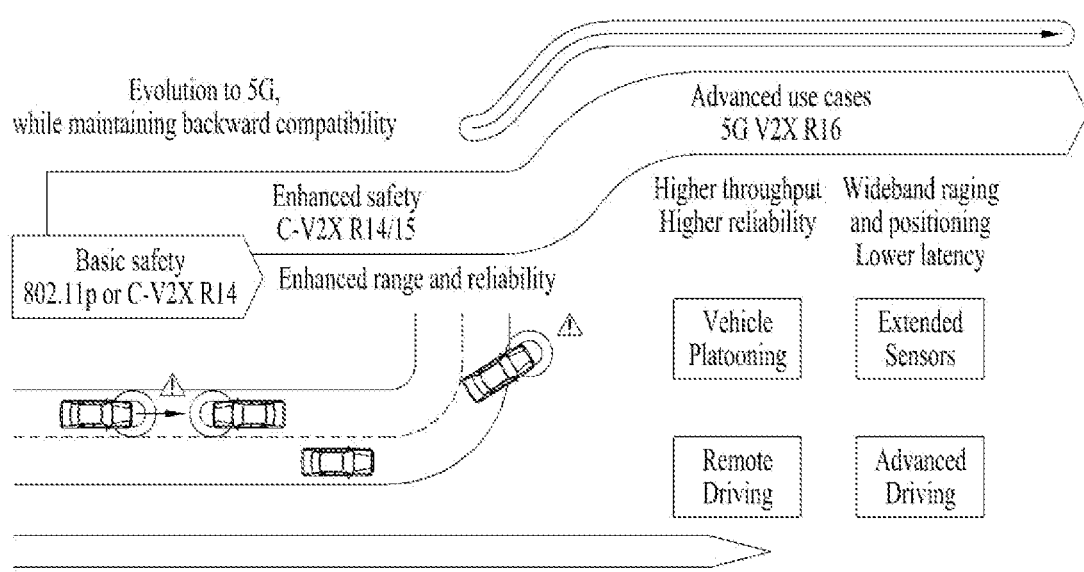
FIG. 1 is a diagram for explaining by comparing V2X communication based on RAT before NR and V2X communication based on NR.

Reference will now be made in detail to the preferred embodiments of the present disclosure, examples of which are illustrated in the accompanying drawings. Wherever possible, the same reference numbers will be used throughout the drawings to refer to the same or like parts.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
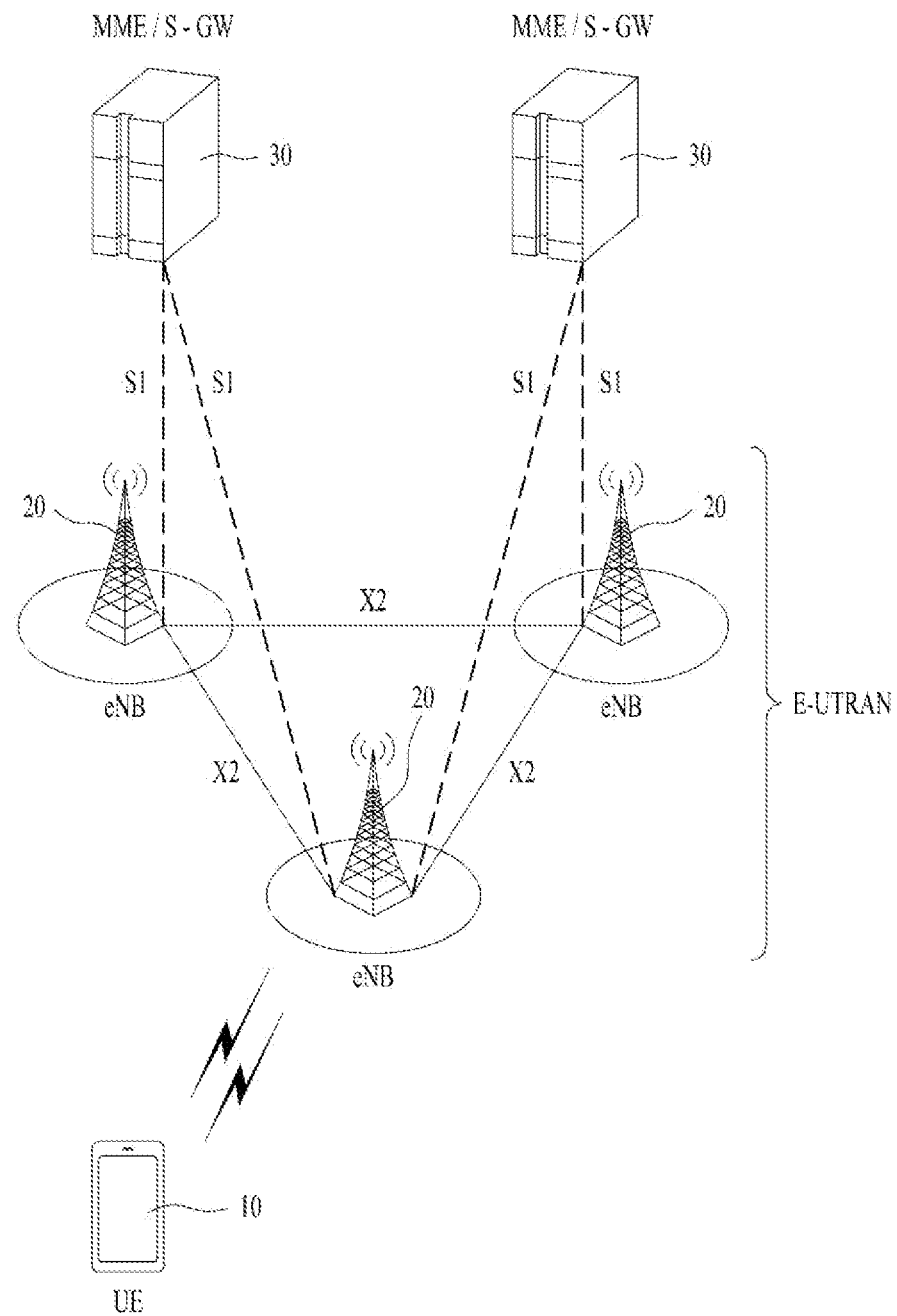
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
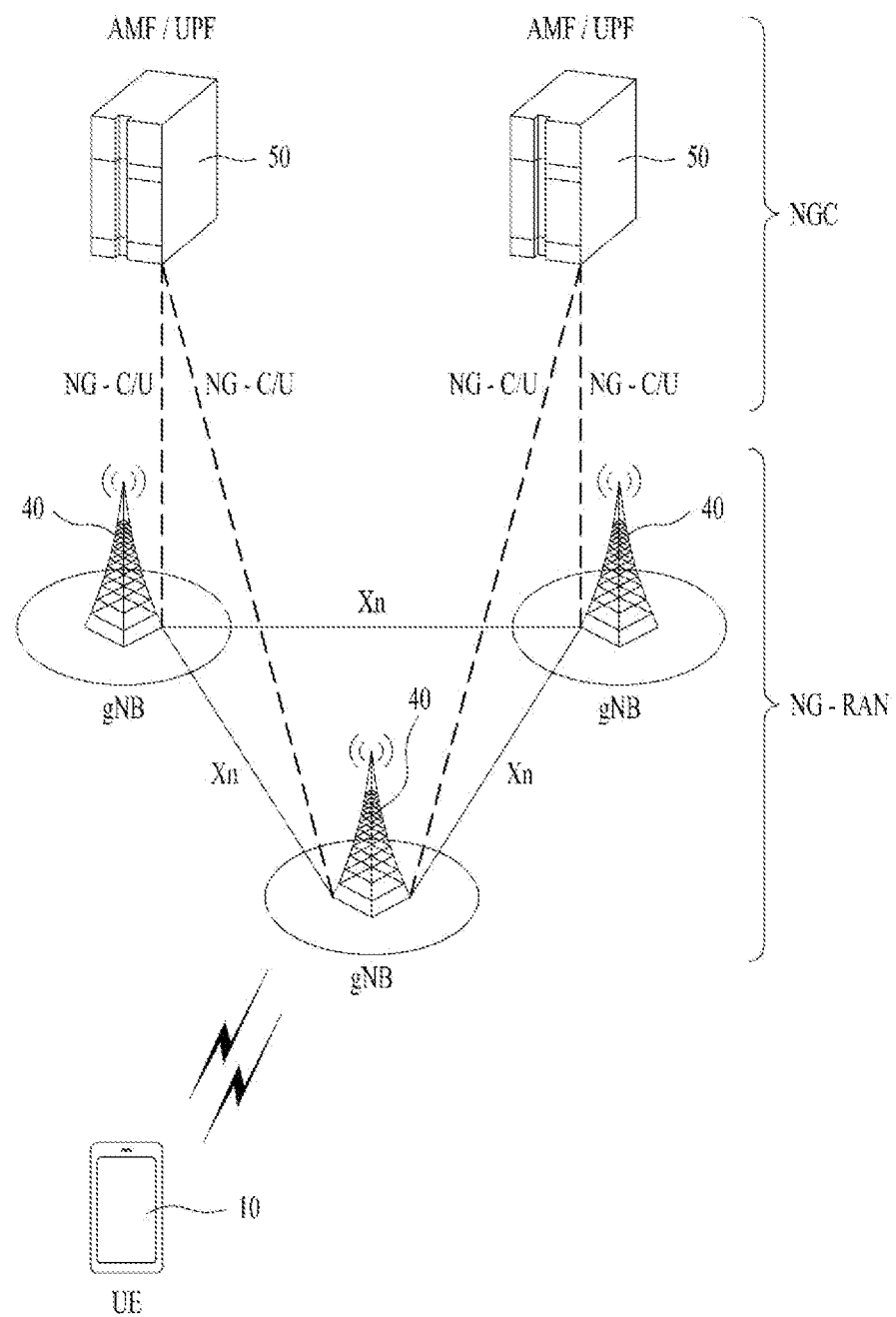
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
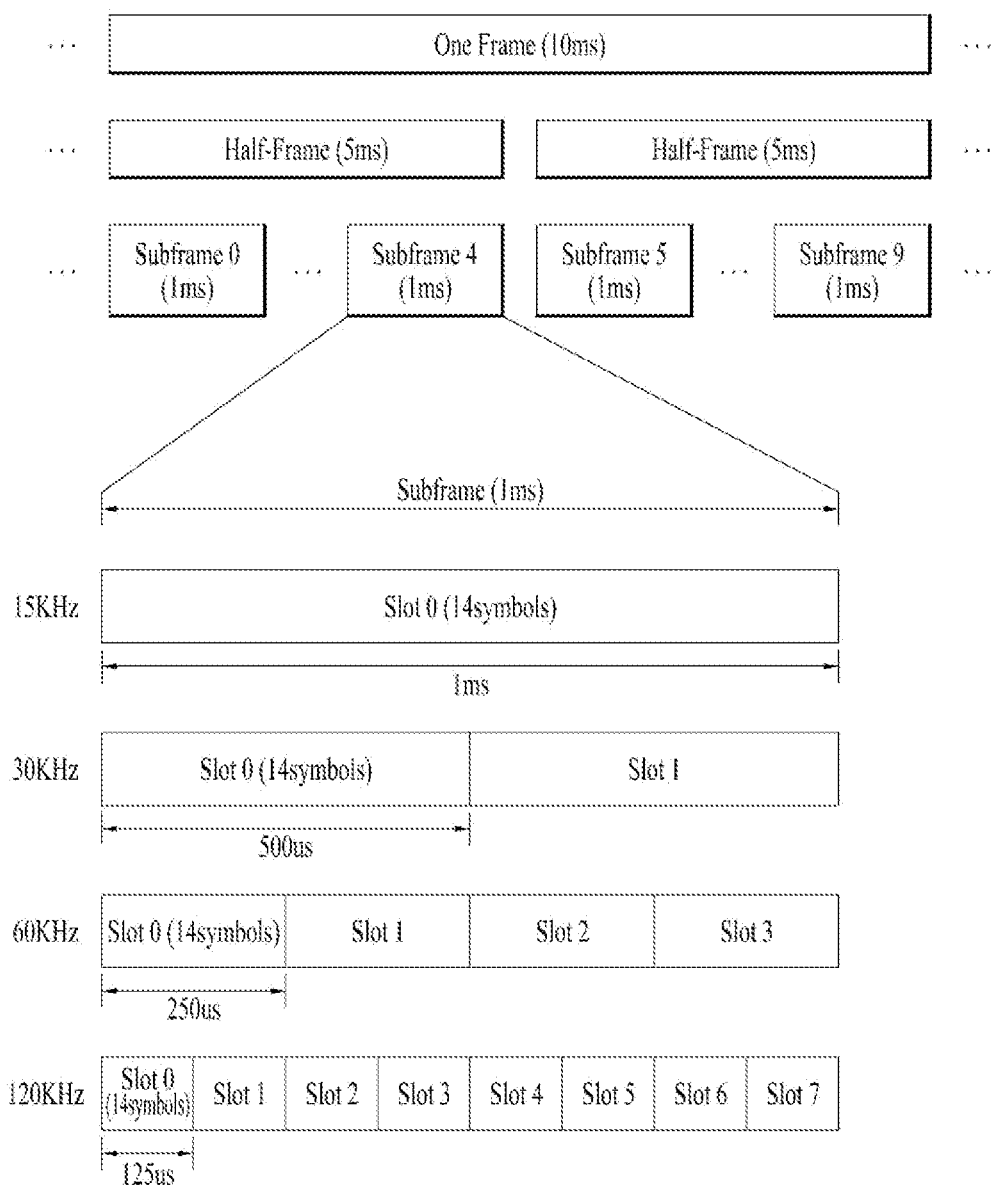
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM (A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration μ in the NCP case.

TABLE 1

| SCS (15 * 2u) | | | |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,\mu}_{slot}$ | $N^{subframe,\mu}_{slot}$ |
|---|---|---|---|
| 60 kHz (u = 2) | 12 | 40 | 4 |

In the NR system, different OFDM (A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHZ, etc.) or higher. For example, the frequency band of 6 GHz (or 5850 MHZ, 5900 MHZ, 5925 MHZ, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz–7125 MHz | 15, 30, 60 kHz |
| FR2 | 24250 MHz–52600 MHz | 60, 120, 240 kHz |

Figure 5:
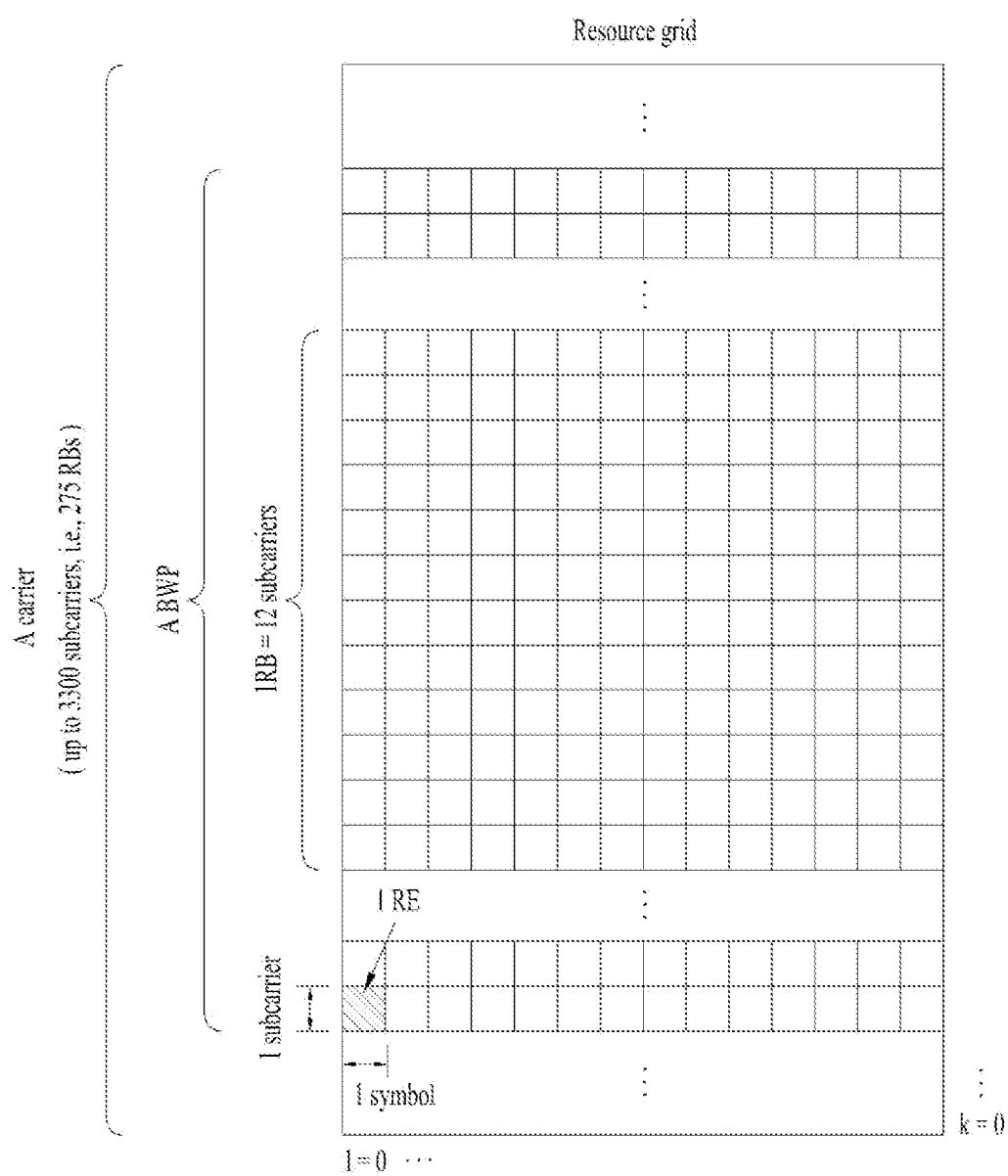
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
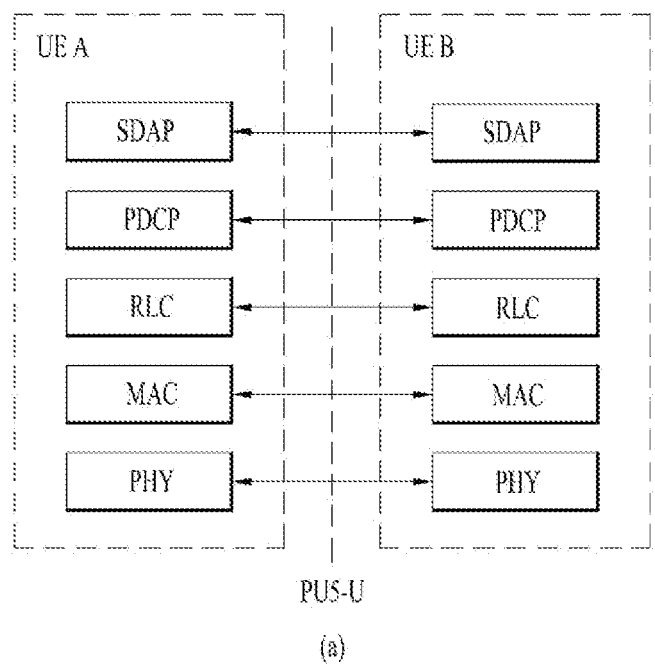
FIG. 6 illustrates a radio protocol architecture for SL communication.
Figure 6:
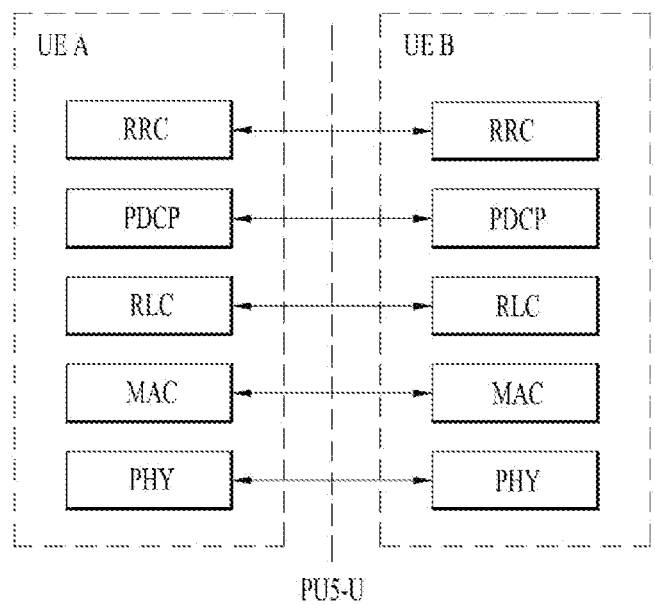

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre) set sidelink BWP (SL BWP). For example, the bandwidth of the S-SSB may be 11 resource blocks (RBs). For example, the PSBCH may span 11 RBs. The frequency position of the S-SSB may be (pre) set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
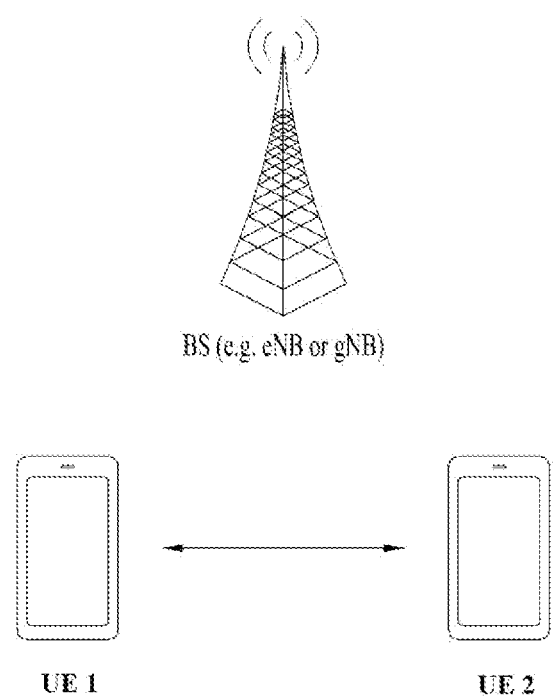
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
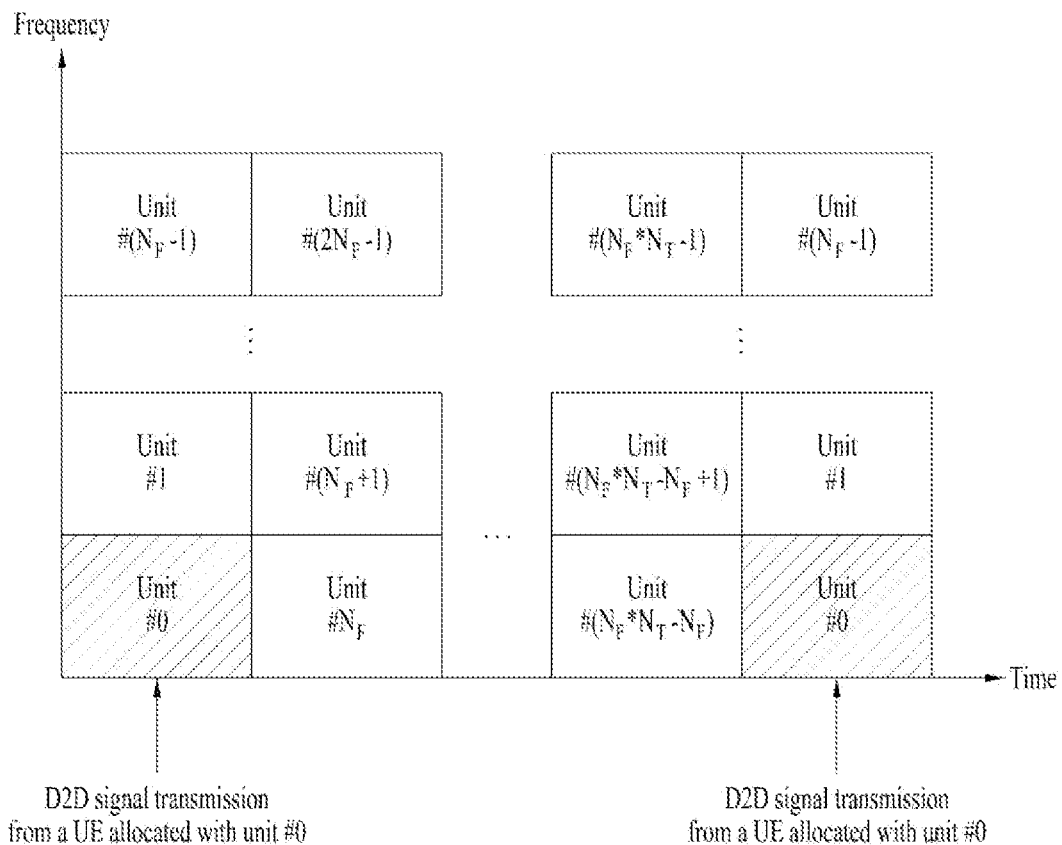
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
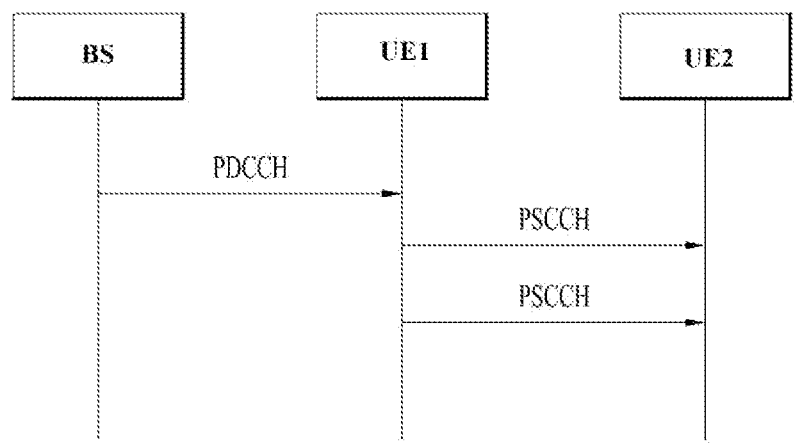
FIG. 9 illustrates a procedure in which UEs perform V2X or SL communication according to a transmission mode.
Figure 9:
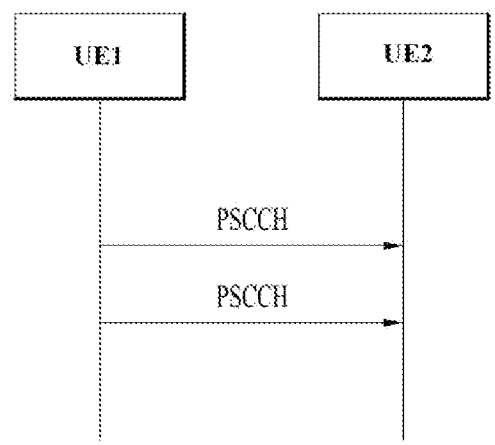

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re) selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re) selection based on the priority. For example, the resource (re) selection procedure may include an operation of identifying candidate resources in a resource selection window by UE 2, and an operation of selecting, by UE 2, a resource for (re) transmission from among the identified candidate resources. For example, the resource selection window may be a time interval during which the UE selects the resource for SL transmission. For example, after UE 2 triggers resource (re) selection, the resource selection window may start at T1>0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re) selection procedure, the transmitting UE may perform initial transmission of a TB without reservation. For example, based on the sensing and resource (re) selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re) transmissions for one TB may be limited by configuration or pre-configuration. For example, the maximum number of HARQ (re) transmissions may be up to 32. For example, when the configuration or pre-configuration is not present, the maximum number of HARQ (re) transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re) transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

The hybrid automatic repeat request (HARQ) scheme may be configured by combining the FEC and the ARQ, may check whether data received by a physical layer contains error that is not capable of being decoded, and may request retransmission when error occurs to improve performance.

In the case of sidelink (SL) unicast and group cast, HARQ feedback and HARQ combining at a physical layer may be supported. For example, when a reception (RX) UE operates in a resource allocation mode 1 or 2, the RX UE may receive a PSSCH from the TX UE, and the RX UE may transmit HARQ feedback to the PSSCH to the TX UE using a sidelink feedback control information (SFCI) format through a physical sidelink feedback channel (PSFCH).

When the SL HARQ feedback is enabled for unicast, if the RX UE successfully decodes the corresponding transport block in the case of a non-Code Block Group (non-CBG) operation, the RX UE may generate HARQ-ACK. The RX UE may transmit HARQ-ACK to a transmission (TX) UE. After the RX UE decodes an associated PSCCH with the RX UE as a target, if the RX UE does not successfully decode the corresponding transport block, the RX UE may generate HARQ-NACK. The RX UE may transmit HARQ-NACK to the TX UE.

When sidelink HARQ feedback is enabled for groupcast, the UE may determine whether to transmit HARQ feedback based on a TX/RX distance and/or RSRP. For a non-CBG operation, two options may be supported.

(1) Option 1: After the RX UE decodes an associated PSCCH, if the RX UE fails to decode the corresponding transport block, the RX UE may transmit a HARQ-NACK on the PSFCH. Otherwise, the RX UE may not transmit a signal on the PSFCH.

(2) Option 2: If the RX UE successfully decodes the corresponding transport block, the RX UE may transmit a HARQ-ACK on the PSFCH. After the RX UE decodes the associated PSCCH targeting the RX UE, if the RX UE does not successfully decode the corresponding transport block, the RX UE may transmit a HARQ-NACK on the PSFCH.

In the case of mode 1 resource allocation, a time between HARQ feedback transmission on the PSFCH and the PSSCH may be (pre) configured. In the case of unicast and groupcast, if retransmission is required on the sidelink, this may be indicated to the BS by the UE within coverage using the PUCCH. The TX UE may transmit an indication to a serving BS of the TX UE in the form such as a Scheduling Request (SR)/Buffer Status Report (BSR) instead of the form of a HARQ ACK/NACK. Even if the BS does not receive the indication, the BS may schedule a sidelink retransmission resource to the UE.

In the case of mode 2 resource allocation, a time between HARQ feedback transmission on the PSFCH and the PSSCH may be (pre) configured.

SL congestion control will be described below.

When the UE autonomously determines SL transmission resources, the UE also autonomously determines the size and frequency of the resources used by itself. Obviously, due to constraints from the network, the use of resource sizes or frequencies above a certain level may be limited. However, in a situation in which a large number of UEs are concentrated in a specific region at a specific time point, when all the UEs use relatively large resources, overall performance may be greatly degraded due to interference.

Therefore, the UE needs to observe a channel condition. When the UE determines that excessive resources are being consumed, it is desirable for the UE to take an action of reducing its own resource use. In this specification, this may be referred to as congestion control. For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Wireless Communication System Supporting Unlicensed Band

Figure 10:
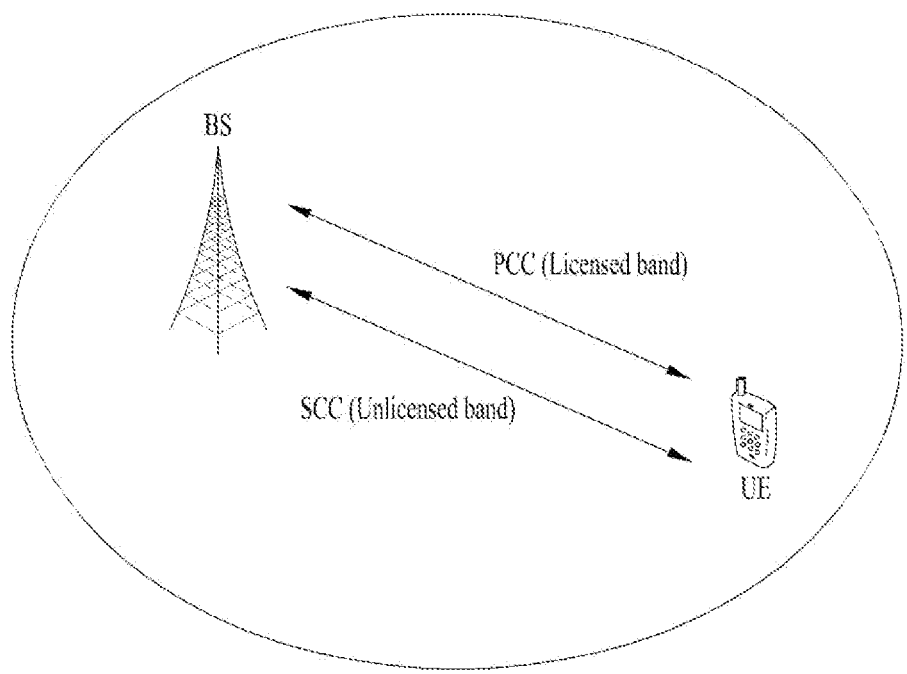
FIG. 10 illustrates a wireless communication system supporting an unlicensed band.
Figure 10:
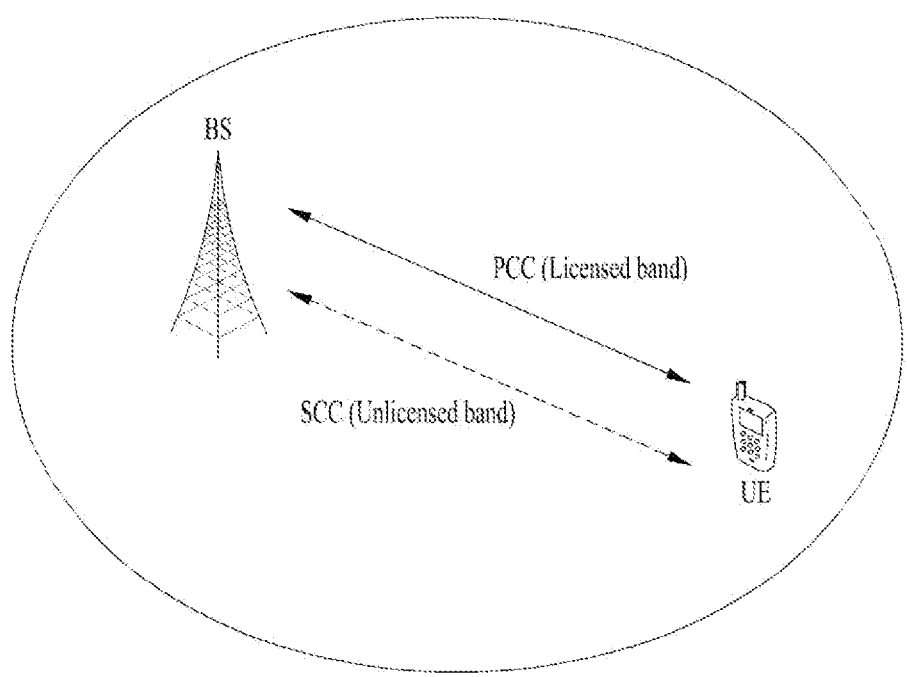

FIG. 10 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

FIG. 10(a) shows a case in which the UE and BS exchange signals on both the LCC and UCC (non-standalone (NSA) mode). In this case, the LCC and UCC may be set to the PCC and SCC, respectively. As shown in FIG. 10(b), the terminal and the base station may transmit and receive signals through one UCC or a plurality of carrier-coupled UCCs. That is, the terminal and the base station can transmit and receive signals through only UCC(s) without LCC. For standalone operation, PRACH, PUCCH, PUSCH, SRS transmission, etc. may be supported in UCell.

The signal transmission/reception operation in an unlicensed band described in the present disclosure may be performed based on the above-described deployment scenario (unless otherwise stated). Also, the definitions below may be applied to terms used herein.

Channel: May be composed of consecutive RBs in which a channel access procedure is performed in a shared spectrum, and may refer to a carrier or a part of a carrier.

Channel Access Procedure (CAP): Represents a procedure for evaluating channel availability based on sensing in order to determine, before signal transmission, whether other communication node(s) use a channel. A basic unit for sensing is a sensing slot of duration $T_{sl}=9$ us. If a BS or a UE senses a channel for the sensing slot duration, and the power detected for at least 4 us within the sensing slot duration is less than an energy detection threshold X Thresh, the sensing slot duration $T_{sl}$ is considered an idle state. Otherwise, the sensing slot duration $T_{sl}=9$ us is considered a busy state. The CAP may be referred to as Listen-Before-Talk (LBT).

Channel occupancy: Means the corresponding transmission(s) by the BS/UE on the channel(s) after the CAP is performed.

Channel Occupancy Time (COT): Refers to the total time for which the BS/UE and any BS/UE(s) sharing the channel occupancy may perform transmission(s) on the channel after the BS/UE performs the CAP. In determining the COT, when the transmission gap is 25 us or less, the gap period is also counted in the COT. The COT may be shared for transmission between the BS and the corresponding UE(s).

DL transmission burst: Defined as a set of transmissions from the BS, with no gap exceeding 16 us. Transmissions from the BS, separated by a gap exceeding 16 us, are considered DL transmission bursts separate from each other. In the DL transmission burst, the BS may perform the transmission(s) after the gap without sensing channel availability.

UL transmission burst: Defined as a set of transmissions from the UE, with no gap exceeding 16 us. Transmissions from the UE, separated by a gap exceeding 16 us, are considered UL transmission bursts separate from each other. In the UL transmission burst, the UE may perform transmission(s) after the gap without sensing channel availability.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 11:
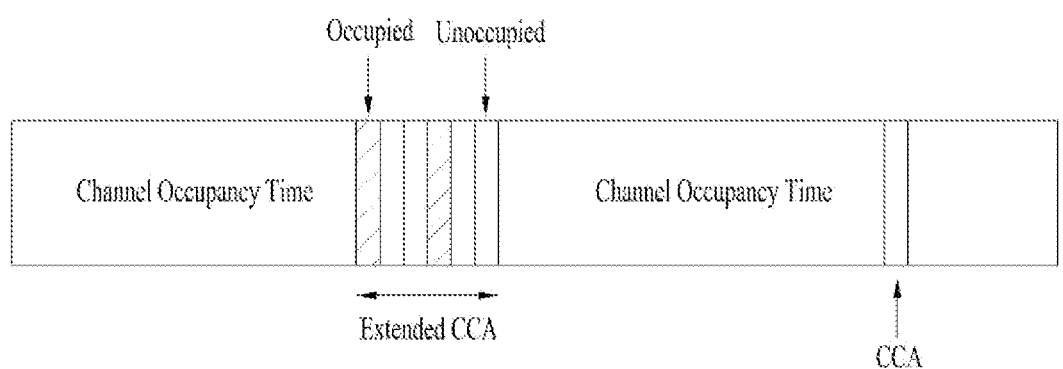
FIG. 11 illustrates an exemplary method of occupying resources in an unlicensed band.

FIG. 11 illustrates a resource occupancy method in a U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.11ac) specifies a CCA threshold of −62 dBm for non-Wi-Fi signals and a CCA threshold of −82 dBm for Wi-Fi signals. When it is determined that the channel is idle, the communication node may start the signal transmission in a UCell. The sires of processes described above may be referred to as Listen-Before-Talk (LBT) or a channel access procedure (CAP). The LBT, CAP, and CCA may be interchangeably used in this document.

Specifically, for DL reception/UL transmission in a U-band, at least one of the following CAP methods to be described below may be employed in a wireless communication system according to the present disclosure.

DL Signal Transmission Method in U-Band

The BS may perform one of the following U-band access procedures (e.g., CAPs) for DL signal transmission in a U-band (1) Type 1 DL CAP Method In the Type 1 DL CAP, the length of a time duration spanned by sensing slots sensed to be idle before transmission(s) may be random. The Type 1 DL CAP may be applied to the following transmissions:

Transmission(s) initiated by the BS including (i) a unicast PDSCH with user plane data or (ii) a unicast PDCCH scheduling user plane data in addition to the unicast PDSCH with user plane data, or Transmission(s) initiated by the BS including (i) a discovery burst only or (ii) a discovery burst multiplexed with non-unicast information.

Figure 12:
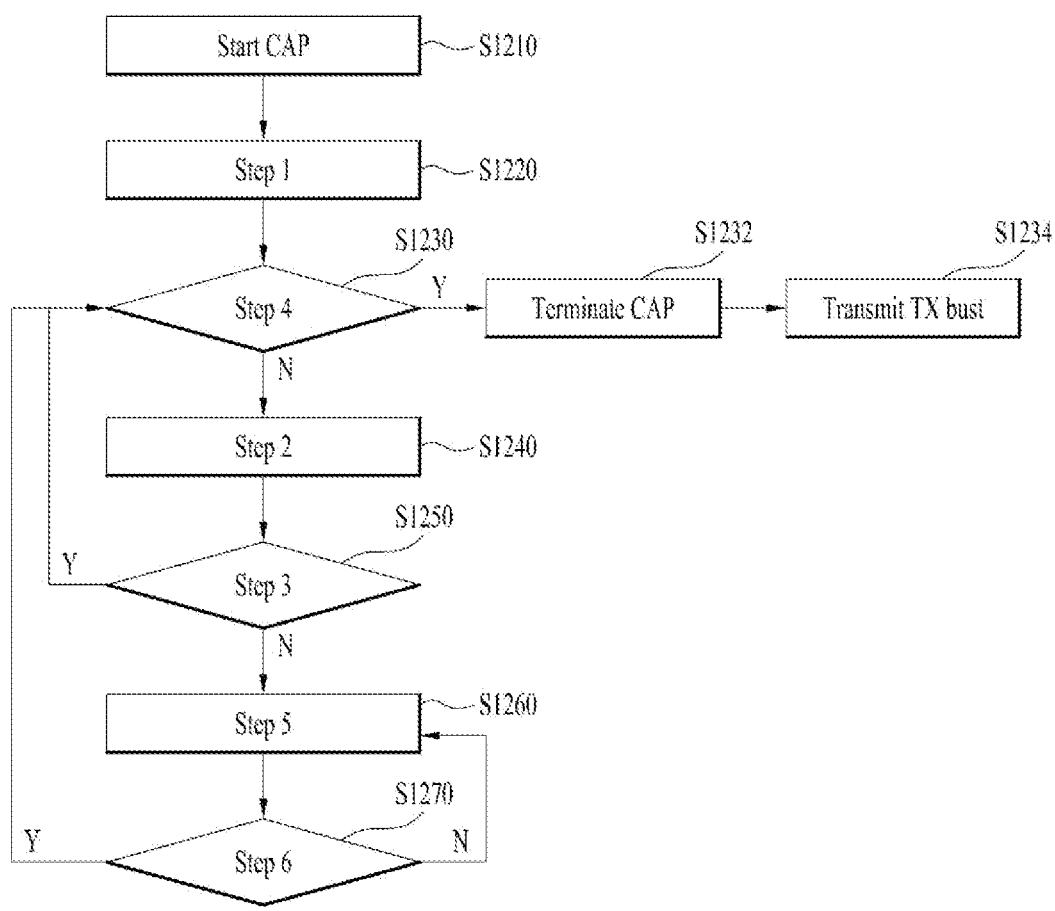
FIGS. 12 and 13 are flowcharts illustrating channel access procedures (CAPs) for signal transmission in an unlicensed band.

FIG. 12 is a flowchart of a CAP operation for transmitting a downlink signal through an unlicensed band of a BS.

Referring to FIG. 12, the BS first senses whether a channel is in an idle state for a sensing slot duration of a defer duration Td, and may then perform transmission when the counter N reaches 0 (S1234). Here, the counter N is adjusted by sensing the channel for additional sensing slot duration(s) according to the procedure below Step 1) (S1220) The BS sets N to $N_{init}$ (N=$N_{init}$), where $N_{init}$ is a random number uniformly distributed between 0 and $CW_p$. Then, step 4 proceeds.

Step 2) (S1240) If N>0 and the BS determines to decrease the counter, the BS sets N to N−1 (N=N−1).

Step 3) (S1250) The BS senses the channel for the additional sensing slot duration. If the additional sensing slot duration is idle (Y), step 4 proceeds. Otherwise (N), step 5 proceeds.

Step 4) (S1230) If N=0 (Y), the BS terminates the CAP (S1232). Otherwise (N), step 2 proceeds.

Step 5) (S1260) The BS senses the channel until either a busy sensing slot is detected within an additional defer duration Td or all the slots of the additional defer duration Td are detected to be idle.

Step 6) (S1270) If the channel is sensed to be idle for all the slot durations of the additional defer duration Td (Y), step 4 proceeds. Otherwise (N), step 5 proceeds.

Table 5 shows that mp, a minimum contention window (CW), a maximum CW, a maximum channel occupancy time (MCOT), and an allowed CW size, which are applied to the CAP, vary depending on channel access priority classes.

TABLE 5

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration Td is composed of a duration of mp consecutive sensing slot Tsl (9 us)+duration Tf (16 us). Tf includes the sensing slot duration Tsl at the start of the 16 us duration.

The following relationship is satisfied: $CW_{min,p} \leq CW_p \leq CW_{max,p}$. $CW_p$ may be initially configured by $CW_p = CW_{min,p}$ and updated before step 1 based on HARQ-ACK feedback (e.g., ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next highest allowed value or maintained as it is.

(2) Type 2 DL CAP Method

In the Type 2 DL CAP, the length of a time duration spanned by sensing slots sensed to be idle before transmission(s) may be determined. The Type 2 DL CAP is classified into Type 2A/2B/2C DL CAPs.

The Type 2A DL CAP may be applied to the following transmissions. In the Type 2A DL CAP, the BS may perform transmission immediately after the channel is sensed to be idle at least for a sensing duration $T_{short\_dl}$=25 us. Here, $T_{short\_dl}$ includes the duration $T_f$ (=16 us) and one sensing slot duration immediately after the duration $T_f$, where the duration $T_f$ includes a sensing slot at the beginning thereof.

Transmission(s) initiated by the BS including (i) a discovery burst only or (ii) a discovery burst multiplexed with non-unicast information, or Transmission(s) by the BS after a gap of 25 us from transmission(s) by the UE within a shared channel occupancy.

The Type 2B DL CAP is applicable to transmission(s) performed by the BS after a gap of 16 us from transmission(s) by the UE within a shared channel occupancy time. In the Type 2B DL CAP, the BS may perform transmission immediately after the channel is sensed to be idle for Tf=16 us. Tf includes a sensing slot within 9 us from the end of the duration. The Type 2C DL CAP is applicable to transmission(s) performed by the BS after a maximum of 16 us from transmission(s) by the UE within the shared channel occupancy time. In the Type 2C DL CAP, the BS does not perform channel sensing before performing transmission.

UL Signal Transmission Method in U-Band

The UE may perform a Type 1 or Type 2 CAP for UL signal transmission in a U-band. In general, the UE may perform the CAP (e.g., Type 1 or Type 2) configured by the BS for UL signal transmission. For example, a UL grant scheduling PUSCH transmission (e.g., DCI formats 0_0 and 0_1) may include CAP type indication information for the UE.

(1) Type 1 UL CAP Method

In the Type 1 UL CAP, the length of a time duration spanned by sensing slots sensed to be idle before transmission(s) is random. The Type 1 UL CAP may be applied to the following transmissions.

PUSCH/SRS transmission(s) scheduled and/or configured by the BS

PUCCH transmission(s) scheduled and/or configured by the BS

Transmission(s) related to a Random Access Procedure (RAP)

Figure 13:
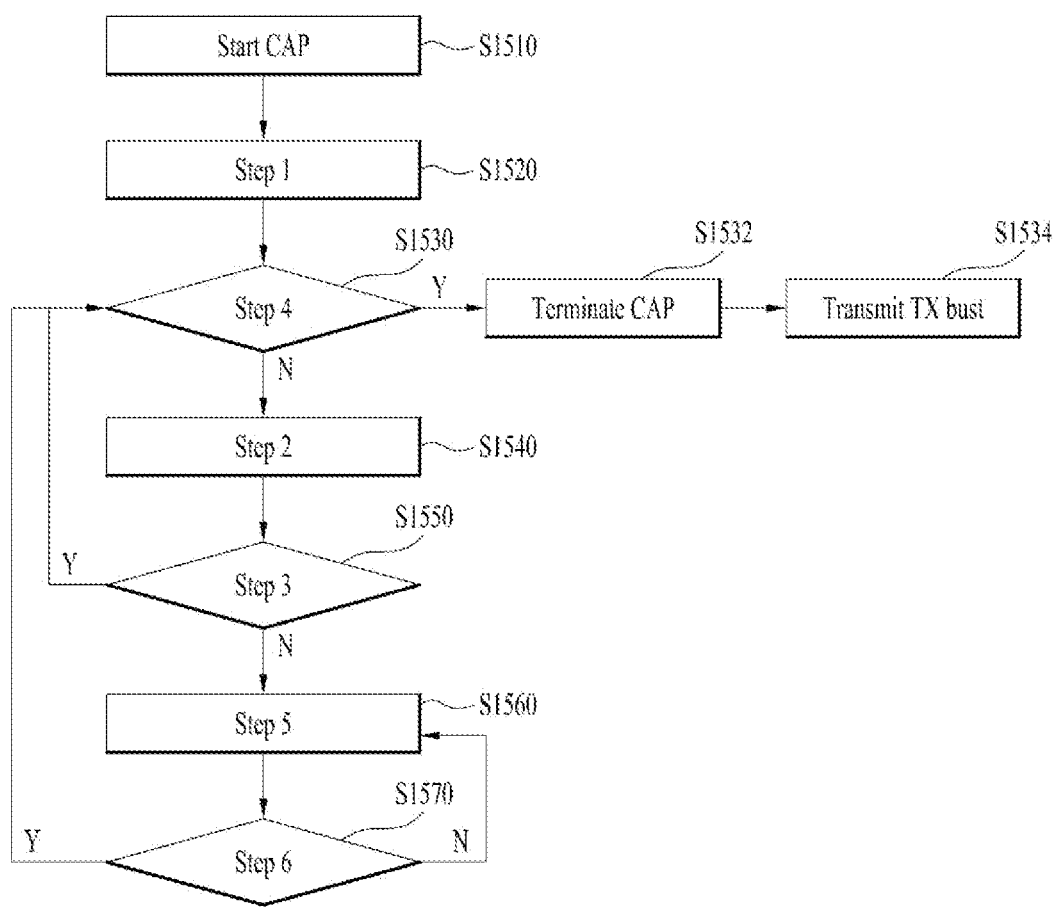

FIG. 13 is a flowchart illustrating CAP operations performed by a UE to transmit a UL signal.

Referring to FIG. 13, the UE may sense whether a channel is idle for sensing slot durations of a defer duration Td. Then, if a counter N is zero, the UE may perform transmission (S1534). In this case, the UE may adjust the counter N by sensing the channel for additional sensing slot duration(s) according to the following steps:

Step 1) (S1520) The UE sets N to $N_{init}$ (N=$N_{init}$), where $N_{init}$ is a random number uniformly distributed between 0 and $CW_p$. Then, step 4 proceeds.

Step 2) (S1540) If N>0 and the UE determines to decrease the counter, the UE sets N to N−1 (N=N−1).

Step 3) (S1550) The UE senses the channel for the additional sensing slot duration. If the additional sensing slot duration is idle (Y), step 4 proceeds. Otherwise (N), step 5 proceeds.

Step 4) (S1530) If N=0 (Y), the UE terminates the CAP (S1532). Otherwise (N), step 2 proceeds.

Step 5) (S1560) The UE senses the channel until either a busy sensing slot is detected within an additional defer duration Ta or all the slots of the additional defer duration Ta are detected to be idle.

Step 6) (S1570) If the channel is sensed to be idle for all the slot durations of the additional defer duration Ta (Y), step 4 proceeds. Otherwise (N), step 5 proceeds.

Table 6 shows that mp, a minimum CW, a maximum CW, an MCOT, and an allowed CW size, which are applied to the CAP, vary depending on channel access priority classes.

TABLE 6

| Channel Access Priority Class (P) | $m_p$ | $CW_{min,p}$ | $CW_{max,p}$ | $T_{ulwcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 8 | 3 | 15 | 1028 | 6 or 10 ms | {15, 31, 63} |
| 4 | 7 | 15 | 1023 | 6 or 10 ms | {15, 31, 63, 127, 255, 511, 1023} |

The defer duration $T_d$ is configured in the following order: duration $T_f$ (16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p} <= CW_p <= CW_{max,p}$. $CW_p$ may be initially configured by $CW_p = CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next highest allowed value or maintained as it is.

(2) Type 2 UL CAP Method

In the Type 2 UL CAP, the length of a time duration spanned by sensing slots sensed to be idle before transmission(s) may be determined. The Type 2 UL CAP is classified into Type 2A/2B/2C UL CAPs. In the Type 2A UL CAP, the UE may perform transmission immediately after the channel is sensed to be idle at least for a sensing duration $T_{short\_dl}$=25 us. Here, $T_{short\_dl}$ includes the duration Tf (=16 us) and one sensing slot duration immediately after the duration Tf. In the Type 2A UL CAP, Tf includes a sensing slot at the beginning thereof. In the Type 2B UL CAP, the UE may perform transmission immediately after the channel is sensed to be idle for the sensing duration Tf=16 us. In the Type 2B UL CAP, Tf includes a sensing slot within 9 us from the end of the duration. In the Type 2C UL CAP, the UE does not perform channel sensing before performing transmission.

RB Interlace

Figure 14:
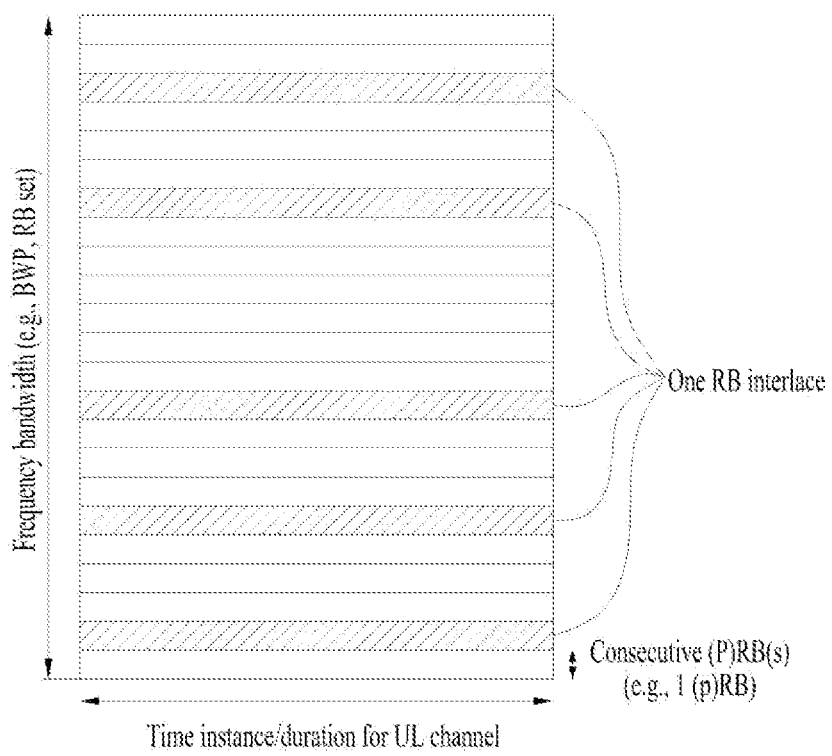
FIG. 14 illustrates a resource block (RB) interlace.

FIG. 14 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 14, a plurality of RB interlaces (interlaces) may be defined in a frequency bandwidth. Here, the frequency bandwidth may include a (wideband) cell/CC/BWP/RB set, and the RB may include a PRB. For example, interlace #m∈{0, 1, . . . , M−1} may consist of (common) RBs {m, M+m, 2M+m, 3M+m, . . . }, where M represents the number of interlaces. A transmitter (e.g., UE) may use one or more interlaces to transmit a signal/channel. The signal/channel may include a PUCCH or PUSCH.

PUCCH Transmission in U-Band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

In addition, PRACH preamble design methods to be described later may be related to UL transmission, and thus, the methods may be equally applied to the above-described UL signal transmission methods in U-band systems. To implement the technical idea of the present disclosure in the corresponding systems, the terms, expressions, and structures in this document may be modified to be suitable for the systems.

For example, UL transmission based on the following PUCCH transmission methods may be performed on an L-cell and/or U-cell defined in the U-band systems.

As described above, the Wi-Fi standard (802.11ac) specifies a CCA threshold of −62 dBm for non-Wi-Fi signals and a CCA threshold of −82 dBm for Wi-Fi signals. In other words, a station (STA) or access point (AP) of the Wi-Fi system may transmit no signal in a specific band if the STA or AP receives a signal from a device not included in the Wi-Fi system in the specific band at a power of −62 dBm or higher.

In this document, the term 'U-band' may be interchangeably used with the term 'shared spectrum'.

In the conventional NR system, five PUCCH formats are configured from PUCCH format 0 to PUCCH format 4 as shown in Table 4 above. PUCCH formats 0, 1, and 4 are configured to occupy a single PRB, and PUCCH formats 2 and 3 are configured to occupy 1 to 16 PRBs over OFDM symbols.

Hereinafter, PUCCH formats used in a shared spectrum will be described. When a specific device (and/or node) transmits a signal in the shared spectrum, there may be PSD restrictions. For example, according to the European Telecommunications Standards Institute (ETSI) regulation, signal transmission in a specific band needs to satisfy a PSD of 10 dBm/1 MHz. When the SCS is 15 kHz, if a PUCCH is transmitted with PUCCH format 0 (one PRB and 180 kHz), the maximum allowable power for the PUCCH may be about 10 dBm. In general, the maximum power of the UE is 23 dBm, and the maximum allowable power of 10 dBm is significantly lower than 23 dBm. If the UE transmits a UL signal at 10 dBm, the maximum UL coverage supported by the UE may be reduced. If the UE transmits a PUCCH in a wide frequency domain (F-domain) to increase the transmit power, it may help to solve the problem that the UL coverage is reduced. As regulations in the shared spectrum, there may be OCB restrictions. For example, when a specific device transmits a signal, the signal may need to occupy at least 80% of the system bandwidth. If the system bandwidth is 20 MHz, the signal transmitted by the specific device may need to occupy more than 16 MHZ, which is 80% of 20 MHz.

As a PUCCH structure in consideration of the PSD and OCB regulations, the above-described RB interlace structure may be used. For example, if a PUCCH sequence of the conventional PUCCH configured to use one PRB as in PUCCH format 0 and/or 1 is repeated over PRBs spaced at specific intervals in the frequency domain in consideration of the OCB, a PUCCH may be configured. If the PUCCH is transmitted in an RB interlace, the same PUCCH sequence may be repeatedly transmitted. The repeated transmission may increase a peak to average power ratio (PAPR) value and a cube metric (CM) value. However, the lower the PAPR and CM values, the better the transmission performance. Accordingly, methods of selecting a cyclic shift (CS) value and/or a phase shift (PS) value of a PUCCH sequence for each repetition in consideration of the PAPR and CM when a PUCCH is transmitted in an RB interlace in the frequency domain will be proposed.

The methods proposed in the present disclosure may be applied to other use cases as well as the NR U-band. For example, the methods proposed in the present disclosure may be used for an NR-based non-terrestrial network (NTN).

The unlicensed band has a configuration corresponding to the shared spectrum, and will be described below as an unlicensed band for convenience of explanation. Hereinafter, a method of allocating a frequency resource for the NR sidelink in an unlicensed band will be described in detail.

Channel Sensing Interval Adjustment for NR Sidelink in Unlicensed Band

The UE may perform transmission and/or reception of a sidelink signal in an unlicensed band. Transmission and/or reception of the sidelink signal in an unlicensed band may be preceded by a channel sensing operation (e.g., energy detection/measurement) for a channel to be used according to band-specific regulations and/or requirements. When the channel or RB set to be used is determined to be IDLE based on the channel sensing result (e.g., when the measured energy is below or less than a specific threshold), the UE may transmit and/or receive the sidelink signal in the unlicensed band. In contrast, when the channel or RB set to be used is determined to be BUSY based on the channel sensing result (e.g., when the measured energy is above or greater than a specific threshold), the UE may cancel all or part of transmission for the unlicensed band.

In an operation in the unlicensed band, the channel sensing operation may be omitted or simplified (relatively small channel sensing interval) within a predetermined time after transmission for a specific time interval of the UE. In contrast, when a predetermined time elapses after transmission of the sidelink signal, it may be required to perform the above-described general channel sensing operation, and after performing the general channel sensing operation, whether to transmit the sidelink signal in the unlicensed band may be determined.

Alternatively, transmission in the unlicensed band is performed when the size and/or power spectral density (PSD) of a time interval and/or frequency occupancy region of a signal/channel transmitted by the UE are equal to or greater than a predetermined level according to regulations or requirements. In other words, in transmission of the sidelink signal in the unlicensed band, the size and/or power size (or power spectral density (PSD)) of the time/frequency resource for the sidelink signal may be regulated according to regulations or requirements. For example, the UE may transmit a sidelink signal in the unlicensed band with the size and/or power spectral density (PSD) of a time interval and/or frequency occupancy region of a signal/channel, which are equal to or greater than a predetermined level.

Alternatively, in the unlicensed band, the UE may inform about occupancy for a certain time for a channel secured through initial general channel sensing through a channel occupancy time (COT) interval information, thereby simplifying channel sensing. Here, the maximum value of the length of the COT interval may be configured differently according to a priority value of a service or a data packet.

The BS may share a COT interval secured through channel sensing by the BS in the form of DCI transmission. The UE may perform a specific (indicated) channel sensing type and/or CP EXTENSION within the COT interval based on DCI information received from the BS. Here, the UE may share the COT interval secured by the UE through channel sensing to the BS receiving the UL transmission. Information related to the COT interval may be provided to the BS through UL based on CG-UCI. In this case, the BS may perform simplified channel sensing within the COT interval shared from the UE. In the case of sidelink communication, as in a Mode 1 RA operation, the UE may receive an indication of a resource to be used for sidelink transmission from the BS through DCI or RRC signaling, or as in a Mode 2 RA operation, the UE may select a transmission resource through a sensing operation between UEs and perform transmission and reception of sidelink without aid of the BS.

In the case of channel access type 1 to be used regardless of a channel occupancy time (COT) configuration, a procedure shown in Table 7 may be performed for DL transmission, and a procedure shown in Table 8 may be performed for UL transmission.

TABLE 7

The eNB/gNB may transmit a transmission after first sensing the channel to be idle during the sensing slot durations of a defer duration $T_d$ and after the counter N is zero in step 4. The counter N is adjusted by sensing the channel for additional sensing slot duration(s) according to the steps below:
1)    set N = $N_{init}$, where $N_{init}$ is a random number uniformly distributed between 0 and $CW_p$, and go to step 4;
2)    if N > 0 and the eNB/gNB chooses to decrement the counter, set N = N − 1;
3)    sense the channel for an additional sensing slot duration, and if the additional sensing slot duration is idle, go to step 4; else, go to step 5;
4)    if N = 0, stop; else, go to step 2.
5)    sense the channel until either a busy sensing slot is detected within an additional defer duration $T_d$ or all the sensing slots of the additional defer duration $T_d$ are detected to be idle;
6)    if the channel is sensed to be idle during all the sensing slot durations of the additional defer duration $T_d$, go to step 4; else, go to step 5;

TABLE 7-continued

If an eNB/gNB has not transmitted a transmission after step 4 in the procedure above, the eNB/gNB may transmit a transmission on the channel, if the channel is sensed to be idle at least in a sensing slot duration $T_{sl}$ when the eNB/gNB is ready to transmit and if the channel has been sensed to be idle during all the sensing slot durations of a defer duration $T_d$ immediately before this transmission. If the channel has not been sensed to be idle in a sensing slot duration $T_{sl}$ when the eNB/gNB first senses the channel after it is ready to transmit or if the channel has been sensed to be not idle during any of the sensing slot durations of a defer duration $T_d$ immediately before this intended transmission, the eNB/gNB proceeds to step 1 after sensing the channel to be idle during the sensing slot durations of a defer duration $T_d$.

The defer duration $T_d$ consists of duration $T_f = 16$ us immediately followed by $m_p$ consecutive sensing slot durations $T_{sl}$, and $T_f$ includes an idle sensing slot duration $T_{sl}$ at start of $T_f$.

If a gNB transmits transmissions including PDSCH that are associated with channel access priority class p on a channel, the gNB maintains the contention window value $CW_p$ and adjusts $CW_p$ before step 1 of the procedure described in clause 4.1.1 for those transmissions using the following steps:

1) For every priority class $p \in \{1, 2, 3, 4\}$, set $CW_p = CW_{min,p}$.
2) If HARQ-ACK feedback is available after the last update of $W_p$, go to step 3. Otherwise, if the gNB transmission after procedure described in clause 4.1.1 does not include a retransmission or is transmitted within a duration $T_w$ from the end of the reference duration corresponding to the earliest DL channel occupancy after the last update of $CW_p$, go to step 5; otherwise go to step 4.
3) The HARQ-ACK feedback(s) corresponding to PDSCH(s) in the reference duration for the latest DL channel occupancy for which HARQ-ACK feedback is available is used as follows:
a. If at least one HARQ-ACK feedback is 'ACK' for PDSCH(s) with transport block based feedback or at least 10% of HARQ-ACK feedbacks is 'ACK' for PDSCH CBGs transmitted at least partially on the channel with code block group based feedback, go to step 1; otherwise go to step 4.
4) Increase $CW_p$ for every priority class $p \in \{1, 2, 3, 4\}$ to the next higher allowed value.
5) For every priority class $p \in \{1, 2, 3, 4\}$, maintain $CW_p$ as it is; go to step 2.

The reference duration and duration $T_w$ in the procedure above are defined as follows:
- The reference duration corresponding to a channel occupancy initiated by the gNB including transmission of PDSCH(s) is defined in this clause as a duration starting from the beginning of the channel occupancy until the end of the first slot where at least one unicast PDSCH is transmitted over all the resources allocated for the PDSCH, or until the end of the first transmission burst by the gNB that contains unicast PDSCH(s) transmitted over all the resources allocated for the PDSCH, whichever occurs earlier. If the channel occupancy includes a unicast PDSCH, but it does not include any unicast PDSCH transmitted over all the resources allocated for that PDSCH, then, the duration of the first transmission burst by the gNB within the channel occupancy that contains unicast PDSCH(s) is the reference duration for CWS adjustment.
- $T_w = \max(T_A, T_B + 1\ \text{ms})$ where $T_B$ is the duration of the transmission burst from start of the reference duration in ms and $T_A = 5$ ms if the absence of any other technology sharing the channel cannot be guaranteed on a long-term basis (e.g. by level of regulation), and $T_A = 10$ ms otherwise.

If a gNB transmits transmissions using Type 1 channel access procedures associated with the channel access priority class p on a channel and the transmissions are not associated with explicit HARQ-ACK feedbacks by the corresponding UE(s), the gNB adjusts CWp before step 1 in the procedures described in subclause 4.1.1, using the latest CWp used for any DL transmissions on the channel using Type 1 channel access procedures associated with the channel access priority class p. If the corresponding channel access priority class p has not been used for any DL transmissions on the channel, $CW_p = CW_{min,p}$ is used.

TABLE 8

A UE may transmit the transmission using Type 1 channel access procedure after first sensing the channel to be idle during the slot durations of a defer duration $T_d$, and after the counter N is zero in step 4. The counter N is adjusted by sensing the channel for additional slot duration(s) according to the steps described below.

1) set $N = N_{init}$, where $N_{init}$ is a random number uniformly distributed between 0 and $CW_p$, and go to step 4;
2) if $N > 0$ and the UE chooses to decrement the counter, set $N = N - 1$;
sense the channel for an additional slot duration, and if the additional slot duration is idle, go to step 4; else, go to step 5;
4) if $N = 0$, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

If a UE has not transmitted a UL transmission on a channel on which UL transmission(s) are performed after step 4 in the procedure above, the UE may transmit a transmission on the channel, if the channel is sensed to be idle at least in a sensing slot duration $T_{sl}$ when the UE is ready to transmit the transmission and if the channel has been sensed to be idle during all the slot durations of a defer duration $T_d$ immediately before the transmission. If TABLE 8-continued the channel has not been sensed to be idle in a sensing slot duration $T_{sl}$ when the UE first
senses the channel after it is ready to transmit, or if the channel has not been sensed to be
idle during any of the sensing slot durations of a defer duration $T_d$ immediately before the
intended transmission, the UE proceeds to step 1 after sensing the channel to be idle during
the slot durations of a defer duration $T_d$.
The defer duration $T_d$ consists of duration $T_f = 16$ us immediately followed by
$m_p$ consecutive slot durations where each slot duration is $T_{sl} = 9$ us, and $T_f$ includes an
idle slot duration $T_{sl}$ at start of $T_f$.
If a UE transmits transmissions using Type 1 channel access procedures that are associated
with channel access priority class p on a channel, the UE maintains the contention window
value $CW_p$ and adjusts $CW_p$ for those transmissions before step 1 of the procedure
described in clause 4.2.1.1, using the following steps:
1)  For every priority class $p \in \{1, 2, 3, 4\}$, set $CW_p = CW_{min,p}$;
2)  If HARQ-ACK feedback is available after the last update of $CW_p$, go to step 3.
Otherwise, if the UE transmission after procedure described in clause 4.2.1.1 does not
include a retransmission or is transmitted within a duration $T_w$ from the end of the
reference duration corresponding to the earliest UL channel occupancy after the last update
of $CW_p$, go to step 5; otherwise go to step 4.
3)  The HARQ-ACK feedback(s) corresponding to PUSCH(s) in the reference
duration for the latest UL channel occupancy for which HARQ-ACK feedback is available
is used as follows:
a.  If at least one HARQ-ACK feedback is 'ACK' for PUSCH(s) with transport block
(TB) based feedback or at least 10% of HARQ-ACK feedbacks are 'ACK' for PUSCH
CBGs transmitted at least partially on the channel with code block group (CBG) based
feedback, go to step 1; otherwise go to step 4.
4)  Increase $CW_p$ for every priority class $p \in \{1, 2, 3, 4\}$ to the next higher allowed
value;
5)  For every priority class $p \in \{1, 2, 3, 4\}$, maintain $CW_p$ as it is; go to step 2.
The HARQ-ACK feedback, reference duration and duration $T_w$ in the procedure above are
defined as the following:
- For the purpose of contention window adjustment in this clause, HARQ-ACK
feedback for PUSCH(s) transmissions are expected to be provided to UE(s) explicitly or
implicitly where explicit HARQ-ACK is determined based on the valid HARQ-ACK
feedback in a corresponding CG-DFI as described in clause 10.5 in [7], and implicit
HARQ-ACK feedback is determined based on the indication for a new transmission or
retransmission in the DCI scheduling PUSCH(s) as follows:
- If a new transmission is indicated, 'ACK' is assumed for the transport blocks or
code block groups in the corresponding PUSCH(s) for the TB-based and CBG-based
transmission, respectively.
- If a retransmission is indicated for TB-based transmissions, 'NACK' is assumed for
the transport blocks in the corresponding PUSCH(s).
- If a retransmission is indicated for CBG-based transmissions, if a bit value in the
code block group transmission information (CBGTI) field is '0' or '1' as described in clause
5.1.7.2 in [8], 'ACK' or 'NACK' is assumed for the corresponding CBG in the
corresponding PUSCH(s), respectively.
- The reference duration corresponding to a channel occupancy initiated by the UE
including transmission of PUSCH(s) is defined in this clause as a duration starting from the
beginning of the channel occupancy until the end of the first slot where at least one
PUSCH is transmitted over all the resources allocated for the PUSCH, or until the end of
the first transmission burst by the UE that contains PUSCH(s) transmitted over all the
resources allocated for the PUSCH, whichever occurs earlier. If the channel occupancy
includes a PUSCH, but it does not include any PUSCH transmitted over all the resources
allocated for that PUSCH, then, the duration of the first transmission burst by the UE
within the channel occupancy that contains PUSCH(s) is the reference duration for CWS
adjustment.
- $T_w = \max(T_A, T_B + 1 \text{ ms})$ where $T_B$ is the duration of the transmission burst from
start of the reference duration in ms and $T_A = 5$ ms if the absence of any other technology
sharing the channel cannot be guaranteed on a long-term basis (e.g. by level of regulation),
and $T_A = 10$ ms otherwise.

In a channel occupancy time (COT), simplified channel access type 2 may be used before transmission, a procedure shown in Table 9 may be performed for DL transmission, and a procedure shown in Table 10 may be performed for UL transmission.

TABLE 9

4.1.2 Type 2 DL channel access procedures

This clause describes channel access procedures to be performed by an eNB/gNB where
the time duration spanned by sensing slots that are sensed to be idle before a downlink
transmission(s) is deterministic.
If an eNB performs Type 2 DL channel access procedures, it follows the procedures
described in clause 4.1.2.1.
Type 2A channel access procedures as described in clause 4.1.2.1 are only applicable to the
following transmission(s) performed by an eNB/gNB:

TABLE 9-continued

- Transmission(s) initiated by an eNB including discovery burst and not including PDSCH where the transmission(s) duration is at most 1 ms, or
- Transmission(s) initiated by a gNB with only discovery burst or with discovery burst multiplexed with non-unicast information, where the transmission(s) duration is at most 1 ms, and the discovery burst duty cycle is at most 1/20, or
- Transmission(s) by an eNB/ gNB following transmission(s) by a UE after a gap of 25 us in a shared channel occupancy as described in clause 4.1.3.

Type 2B or Type 2C DL channel access procedures as described in clause 4.1.2.2 and 4.1.2.3, respectively, are applicable to the transmission(s) performed by a gNB following transmission(s) by a UE after a gap of 16 us or up to 16 us, respectively, in a shared channel occupancy as described in clause 4.1.3.

4.1.2.1 Type 2A DL channel access procedures

An eNB/gNB may transmit a DL transmission immediately after sensing the channel to be idle for at least a sensing interval $T_{short\_dl} = 25$ us. $T_{short\_dl}$ consists of a duration $T_f = 16$ us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

4.1.2.2 Type 2B DL channel access procedures

A gNB may transmit a DL transmission immediately after sensing the channel to be idle within a duration of $T_f = 16$ us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.

4.1.2.3 Type 2C DL channel access procedures

When a gNB follows the procedures in this clause for transmission of a DL transmission, the gNB does not sense the channel before transmission of the DL transmission. The duration of the corresponding DL transmission is at most 584 us.

TABLE 10

4.2.1.2 Type 2 UL channel access procedure

This clause describes channel access procedures by UE where the time duration spanned by the sensing slots that are sensed to be idle before a UL transmission(s) is deterministic.
If a UE is indicated by an eNB to perform Type 2 UL channel access procedures, the UE follows the procedures described in clause 4.2.1.2.1.

4.2.1.2.1 Type 2A UL channel access procedure

If a UE is indicated to perform Type 2A UL channel access procedures, the UE uses Type 2A UL channel access procedures for a UL transmission. The UE may transmit the transmission immediately after sensing the channel to be idle for at least a sensing interval $T_{short\_ul} = 25$ us. $T_{short\_ul}$ consists of a duration $T_f = 16$ us immediately followed by one sensing slot and Trincludes a sensing slot at start of $T_f$. The channel is considered to be idle for $T_{short\_ul}$ if both sensing slots of $T_{short\_ul}$ are sensed to be idle.

4.2.1.2.2 Type 2B UL channel access procedure

If a UE is indicated to perform Type 2B UL channel access procedures, the UE uses Type 2B UL channel access procedure for a UL transmission. The UE may transmit the transmission immediately after sensing the channel to be idle within a duration of $T_f = 16$ us. $T_f$ includes a sensing slot that occurs within the last 9 us of $T_f$. The channel is considered to be idle within the duration $T_f$ if the channel is sensed to be idle for total of at least 5 us with at least 4 us of sensing occurring in the sensing slot.

4.2.1.2.3 Type 2C UL channel access procedure

If a UE is indicated to perform Type 2C UL channel access procedures for a UL transmission, the UE does not sense the channel before the transmission. The duration of the corresponding UL transmission is at most 584 us.

The method of Type 2A DL and/or UL channel access described above in Tables 7 to 10 may be similarly applied to sidelink (SL) communication for an unlicensed band.

In detail, Type 2A SL channel access may include a sensing duration of $T_{short\_sl}=25$ us in the same way as Type 2A DL and/or UL channel access, the duration may include $T_f(=16$ us) and one sensing slot immediately thereafter, and Tf may have a form including a sensing slot at the beginning. Basic IDLE determination may also be performed in the same or similar manner as DL or UL.

Alternatively, Type 2B SL channel access may perform SL transmission immediately after sensing that an idle state is within the Tf (=16 us) period in the same manner as Type 2B DL and/or UL channel access. In the Tf, a sensing slot may be configured within the last 9 us. Basic IDLE determination may also be performed in the same or similar manner as DL or UL.

Alternatively, Type 2C SL channel access may have a type in which channel sensing is not performed in the same manner as Type 2C DL and/or UL channel access. However, a time interval of SL transmission may be a maximum of 584 us.

Alternatively, Type 1 SL channel access may randomly derive an integer value N based on the size of a contention window (CW) corresponding to PRIORITY CLASS in the same manner as Type 1 DL and/or UL channel access. If the channel sensing result for DEFER duration of a Td size corresponding to PRIORITY CLASS is IDLE, an N−1 counter value may be reduced in units of Tsl for IDLE, and when the counter value is 0, the UE may occupy an RB set or a channel targeted for channel sensing. In contrast, when a part of the channel sensing result for the Tsl duration is determined to be BUSY, the counter value may be maintained and channel sensing may be continued until the channel sensing result in units of DEFER DURATION of a Td size becomes IDLE again. DEFER DURATION of the Td size may have a form in which mp Tsl are continuously configured after Tf (=16 us), where mp is a value determined according to PRIORITY CLASS p and Tsl (=9 us) is a time interval at which channel sensing is performed.

Alternatively, when the UE is not ready for SL transmission while occupying a channel based on Type 1 SL channel access, the UE may configure a defer duration of Ta and a sensing duration with a length of $T_{sl}$ before ready SL transmission. If the two durations are all idle, the UE may directly perform the SL transmission. On the other hand, if at least one of the durations is busy, the UE may perform the Type 1 SL channel access again. Alternatively, if it is difficult to perform SL transmission at a time when channel sensing ends (e.g., when the end of the channel sensing is behind the start of the SL transmission), the UE may reselect resources for the SL transmission. In this case, the resource reselection may be performed in consideration of the end of the channel sensing and/or the length of a remaining sensing duration. For example, the remaining sensing duration may be derived by assuming that all channel sensing is idle.

For SL, SL HARQ-ACK feedback may be disabled. For a specific SL HARQ-ACK feedback option, a receiving UE may transmit a NACK only when TB decoding (or decoding) fails and may not transmit SL HARQ-ACK feedback when TB decoding (or decoding) succeeds. Accordingly, the size of a contention window (CW) for SL communication may be adjusted differently from that of DL or UL.

For example, the initial value of a contention window ($CW_p$) for the priority class (p) may be set to the predefined value, $CW_{min,p}$.

For example, when at least one of the following specific cases is satisfied, the UE may maintain the value of the contention window ($CW_p$) for every priority class (p) or a specific priority class, regardless of whether retransmission is performed for the same TB in consideration of the SL characteristics. For example, the above specific cases may include: a case where reception of SL HARQ-ACK feedback (or HARQ feedback) is not expected after the last update of the contention window ($CW_p$); and/or a case where only PSCCH/PSSCH transmission where SL HARQ-ACK feedback is disabled exists within a reference duration corresponding to the earliest SL channel occupancy after the last update of the contention window ($CW_p$). For example, the PSCCH/PSSCH transmission where SL HARQ-ACK feedback is disabled may be present only when the cast type of SL signal is broadcast or groupcast.

For example, the UE may maintain the contention window ($CW_p$) for every priority class (p) in at least one of the following cases. In other cases, the UE may increase the contention window ($CW_p$) for every priority class (p) to a next allowed value.

When the UE does not expect to receive SL HARQ-ACK feedback after the last update of the contention window (CWp) for the priority class (p), When only the PSCCH/PSSCH transmission where SL HARQ-ACK feedback is disabled exists within the reference duration corresponding to the earliest SL channel occupancy after the last update of the contention window (CWp), and When retransmission is not included within the reference duration, and when an SL signal is (re)transmitted within a specific time duration ($T_w$) from the end of the reference duration.

Herein, the specific time duration ($T_w$) may be configured (or preconfigured) for each resource pool and/or each SL priority. For example, the specific time duration ($T_w$) may be defined by max ($T_A$, $T_B$+1 ms), where $T_B$ is the duration length of a transmission burst from the start of the reference duration, and TA is may be set to 5 or 10 msec, depending on the presence or absence of other RATs and/or other links (for example, 5 msec if other RATs and/or links are not present, and 10 msec if other RATs and/or links are present).

For example, when at least one of the following cases is satisfied, the contention window ($CW_p$) for every priority class (p) may be reset to a minimum value (or the contention window for each priority class (p) may be reset to the minimum value). In other cases, the contention window ($CW_p$) for every priority class (p) may be increased to a next allowed value (or each contention window may be increased to the next allowed value).

When SL HARQ-ACK feedback for a PSCCH/PSSCH in which SL HARQ-ACK feedback is enabled is expected or present within the reference duration transmitted by the UE after the last update of the contention window ($CW_p$) for the priority class (p), and when at least one SL HARQ-ACK is determined to be an ACK (for example, the SL HARQ-ACK may be determined to be the ACK when the UE detects no PSFCH according to SL HARQ-ACK feedback option 1 (i.e., NACK-ONLY)).

Alternatively, when at least one of the following cases is satisfied, the contention window ($CW_p$) for every priority class (p) may be increased to a next allowed value (or the contention window for each priority class (p) may be increased to the next allowed value). In other cases, the contention window ($CW_p$) for every priority class (p) may be reset to a minimum value (or the contention window for each priority class (p) may be reset to an initial value).

When SL HARQ-ACK feedback for a PSCCH/PSSCH in which SL HARQ-ACK feedback is enabled is present or expected within the reference duration transmitted by the UE after the last update of the contention window ($CW_p$) for the priority class (p), and when the rate at which the SL HARQ-ACK is determined to be a NACK is greater than or equal to a specific threshold (in this case, the specific threshold may be configured (or preconfigured) or may be predefined as about 90%, 80%, etc.).

Alternatively, when at least one of the following cases is satisfied, the contention window ($CW_p$) for every priority class (p) may be increased to a next allowed value (or the contention window for each priority class (p) may be increased to the next allowed value). In other cases, the contention window (CWp) for every priority class (p) may be reset to a minimum value (or the contention window for each priority class (p) may be reset to an initial value).

When SL HARQ-ACK feedback for a PSCCH/PSSCH in which SL HARQ-ACK feedback is enabled is expected or present within the reference duration transmitted by the UE after the last update of the contention window ($CW_p$) for the priority class (p), and when the rate at which the SL HARQ-ACK is determined as DTX is greater than or equal to a specific threshold (in this case, the specific threshold may be configured (or preconfigured) or may be predefined as about 90%, 80%, etc.).

Alternatively, when PSSCH transmission for groupcast HARQ-ACK feedback option 1 (NACK-ONLY) exists within the reference duration, the contention window ($CW_p$) may be resized based on the NACK. In other cases, the size may be changed based on the ACK or DTX.

Alternatively, the contention window ($CW_p$) for every priority class (p) may be reset to each minimum value when a PSCCH/PSSCH triggering an SL CSI report is present within the reference duration transmitted by the UE after the last update of the contention window ($CW_p$) for the priority class (p) and when at least one SL CSI report is successfully received. The contention window (CWp) for every priority class (p) may be increased with each next allowed value when no SL CSI report is detected within the latency bound for the SL CSI report.

In the above proposals, whether to perform retransmission may be determined based on other SCI received by the UE or determined depending on the presence or absence of retransmission resources included in SCI previously received by the UE and the location of the retransmission resources.

Alternatively, the above reference duration may be i) a duration from the start of channel occupancy for a COT acquired by the UE (for SL communication) and/or a COT acquired by the BS (for SL communication) to the end of a first slot in which specific SL transmission is actually performed among all resources allocated for SL transmission; ii) a duration from the start of the channel occupancy for the COT acquired by the UE (for SL communication) and/or the COT acquired by the BS (for SL communication) to the end of a first transmission burst including the actual specific SL transmission among all resources allocated for SL transmission; or iii) a duration from the start of the channel occupancy for the COT acquired by the UE (for SL communication) and/or the COT acquired by the BS (for SL communication) to the earlier of the end of 'i)' or the end of 'ii)'. For example, the reference duration may be configured (or preconfigured) for each resource pool and/or for each SL (packet) priority (or ProSe Per-Packet Priority (PPPP)) of SL transmission of the UE when the COT is initialized.

Alternatively, the above-described (specific) SL (signal) transmission may be transmission of a PSCCH/PSSCH for unicast and/or groupcast and/or a PSCCH/PSSCH in which SL HARQ-ACK feedback is enabled. Alternatively, the above-described COT duration may be configured or combined differently depending on whether the COT duration is initialized by the UE or BS.

Alternatively, the size of the contention window for SL may be adjusted separately for each unicast session (group), each cast type, each transmission priority, each SL transmission where SL HARQ-ACK feedback is enabled/disabled, and/or each SL HARQ-ACK feedback option. For example, the contention window size may be adjusted separately for the following cases: when a first UE perform SL transmission to a second UE and when the first UE performs SL transmission to a third UE. Alternatively, when the contention window size is adjusted based on the HARQ-ACK, the HARQ-ACK may be limited to a specific cast type and/or a specific unicast session.

Alternatively, the contention window size for SL may be adjusted based on a specific cast type (e.g., unicast or groupcast) and/or a PSSCH in which SL HARQ-ACK feedback is enabled.

Alternatively, resetting the value or size of the contention window ($CW_p$) to each minimum value ($CW_{min,p}$) may be replaced by reducing the value of the contention window ($CW_p$) to a previous allowed value.

For example, for Type 1 SL channel access, the contention window ($CW_p$) may be configured (or preconfigured) for each priority class, each SL priority, and/or each resource pool. For example, the size of the contention window ($CW_p$) may not be configured by the UE. For example, the BS may provide information about the configuration of the size of the contention window ($CW_p$) for each priority class, each SL priority, and/or each resource pool.

For example, conditions for using Type 2A channel access may include: a case in which the UE transmits a synchronization signal and/or a PSBCH for an unlicensed band; a case in which the length of a sidelink transmission period is less than or equal to 1 msec; and/or a case in which the sum of transmission periods within a predetermined period of 20 msec is less than or equal to 1 msec.

The above proposals may be applied in different combinations depending on whether transmission is performed within or outside a COT. Alternatively, the proposals may be applied in different combinations depending on the type of COT (for example, whether the COT is semi-static or varies over time). Alternatively, the proposals may be applied in different combinations depending on the presence or absence of a guard between carriers and RB sets or according to regulations.

In the above proposals, it is assume that the size of the contention window ($CW_p$) is changed for all priority classes. However, the proposals may also be applied when the size of the contention window ($CW_p$) is changed for each specific priority class or each SL priority.

The above-described channel access type may be configured or indicated for each SL channel. For example, a channel access type indicated by corresponding SCI may be used as a channel access type related to PSFCH transmission. Additionally/alternatively, the UE may use channel access type 1 or channel access type 2 depending on whether PSCCH/PSSCH transmission is outside (or within) a COT. Alternatively, a different channel access type may be configured or indicated depending on the type of information included in an SL channel. For example, for PSSCH transmission including a CSI report, a channel access type indicated by SCI triggering a CSI report may be used.

Figure 15:
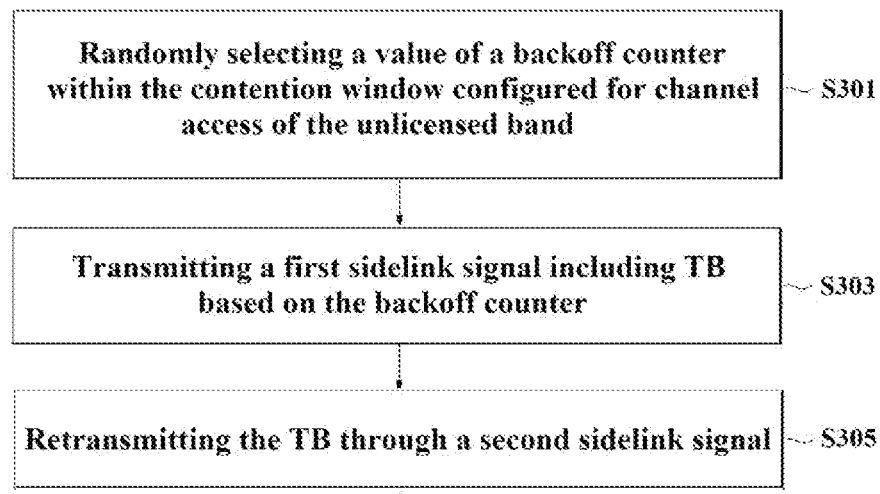
FIG. 15 is a diagram for explaining a method by which a first UE configures a contention window related to sidelink signal transmission in an unlicensed band.

FIG. 15 is a diagram for explaining a method by which a first UE configures a contention window related to SL signal transmission in an unlicensed band.

To transmit SL signals in the unlicensed band, the first UE may perform channel access according to channel access type 1 or channel access type 2 (type 2A, type 2B, or type 2C) based on Tables 7 to 10.

Referring to FIG. 15, the first UE may perform channel access based on channel access type 1 (SL channel access type 1) to transmit SL signals in the unlicensed band. Specifically, the first UE may select a random back-off counter value within a contention window ($CW_p$) related to the unlicensed band (S301). In this case, the contention window (or the size of the contention window) may be configured for a priority class (p) related to the channel access in the unlicensed band (or each priority class) as described above. For example, the size of the contention window may be configured for each priority class. Alternatively, the size of the contention window may be configured for each packet priority (PPPP) and/or resource pool related to SL communication.

Next, the first UE may transmit a first SL signal including a TB in the unlicensed band based on a back-off counter (S303). For example, the first UE may perform sensing operation for a channel (or subchannel) to be used, counts as much as the selected random back-off counter value based on the sensing result, and then transmit the first SL signal including the TB based on that the back-off counter becomes zero. In this case, the first SL signal may be transmitted over a PSSCH or PSCCH.

Next, the first UE may transmit a second SL signal for retransmitting the TB based on the channel access (S305). For example, in SL communication, the TB (or single TB) may be retransmitted a predetermined number of times, regardless of HARQ ACK/NACK reception as described above. This may be applied even when SL signals are transmitted in an unlicensed band. In this case, after initially transmitting the first SL signal including the TB, the first UE may retransmit the same TB a predetermined number of times in the second SL signal, regardless of HARQ ACK/NACK reception. Thus, the size of the contention window needs to be configured in consideration of the SL communication characteristics related to the same TB retransmission. For UL and DL signals, the size of the contention window may be increased to a next allowed value according to the retransmission of the TB. However, when a specific condition is satisfied even if the TB needs to be retransmitted, the size of the contention window may be maintained in the SL communication, without increasing to the next allowed value. In other words, even when the TB is retransmitted in the second SL signal, the size of the contention window may be maintained without increasing to the next allowed value if the specific condition is satisfied.

Specifically, when the specific condition is satisfied, the first UE may maintain the size of the contention window regardless of whether the TB is retransmitted. The specific condition may include: a case in which reception of HARQ feedback for the first SL signal (or a plurality of SL signals including the first SL signal transmitted after the last update of the contention window) is not expected; and/or a case in which only the first SL signal (or a plurality of SL signals including the first SL signal) where HARQ feedback is disabled is transmitted during a first duration. The first duration may be a reference duration corresponding to the earliest SL channel occupancy after the last update of the contention window. That is, the first duration may span from the start of the earliest SL channel occupancy to the end of a first slot in which the first SL signal is transmitted. Alternatively, the length of the reference duration may be configured for each packet priority (PPPP) and/or resource pool related to SL communication. For example, the length of the reference duration may be set shorter as the packet priority is higher.

Alternatively, the specific condition may further include a case in which the first SL signal where the HARQ feedback reception is not expected has a specific cast type. For example, based on that the first SL signal where the HARQ feedback reception is not expected has a broadcast type or a groupcast type, the size of the contention window may be maintained regardless of whether the TB is retransmitted. On the other hand, when the first SL signal has a unicast type, the size of the contention window may be increased to the next allowed value even if the reception of the HARQ feedback for the first SL signal is not expected.

Alternatively, when the size of the contention window is maintained due to the satisfaction of the specific condition, the first UE may maintain the sizes of all contention windows for priority classes related to the channel access in the unlicensed band.

Alternatively, when the HARQ feedback (or SL HARQ-ACK) for the first SL signal is expected due to enabling (or disabling) of HARQ for the first SL signal (that is, when the above specific condition is not satisfied), the first UE may initialize the size of the contention window to an initial value ($CW_{min,p}$) or increase the size of the contention window to the next allowed value, based on the retransmission of the TB.

Specifically, as described above, when SL HARQ-ACK feedback for a PSCCH/PSSCH where SL HARQ-ACK feedback is enabled is expected within the reference duration after the last update of the contention window, if at least one HARQ-ACK is determined to be an ACK (for example, the SL HARQ-ACK may be determined to be an ACK if the first UE detects no PSFCH according to SL HARQ-ACK feedback option 1 (i.e., NACK-ONLY)), the UE may initialize the size of the contention window. For example, if the first UE transmits a plurality of SL signals and receives an ACK for at least one SL signal within the reference duration, the first UE may initialize the size of the contention window. Alternatively, when a PSCCH/PSSCH triggering a SL CSI report exists within the reference duration, and when at least one SL CSI report is successfully received, the first UE may initialize the size of the contention window. In other cases, the size of the contention window may be increased to the next allowed value.

Alternatively, when the HARQ feedback (or SL HARQ-ACK) for the first SL signal is expected because the HARQ for the first SL signal is enabled, if the rate at which the HARQ-ACK is determined to be DTX is greater than or equal to a specific threshold (in this case, the specific threshold may be predefined as about 90% or 80%), the first UE may increase the size of the contention window to the next allowed value. Alternatively, when the rate at which the SL HARQ-ACK is determined to be a NACK is greater than or equal to a specific threshold, the first UE may increase the size of the contention window to the next allowed value. Alternatively, when the PSCCH/PSSCH triggering the SL CSI report is present within the reference duration after the last update of the contention window, and when no SL CSI report is detected within the latency bound for the SL CSI report, the first UE may increase the size of the contention window to the next allowed value.

As described above, according to the proposed methods, the size of the contention window in the unlicensed band may be adjusted in consideration of the characteristics of SL communication, thereby minimizing an unnecessary increase in the size of the contention window in the SL communication, improving the efficiency of use of resources related to SL signal transmission and reception, and smoothly performing the SL communication in the unlicensed band.

Hereinafter, devices in which the above-described proposed methods are implemented will be described in detail.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 16:
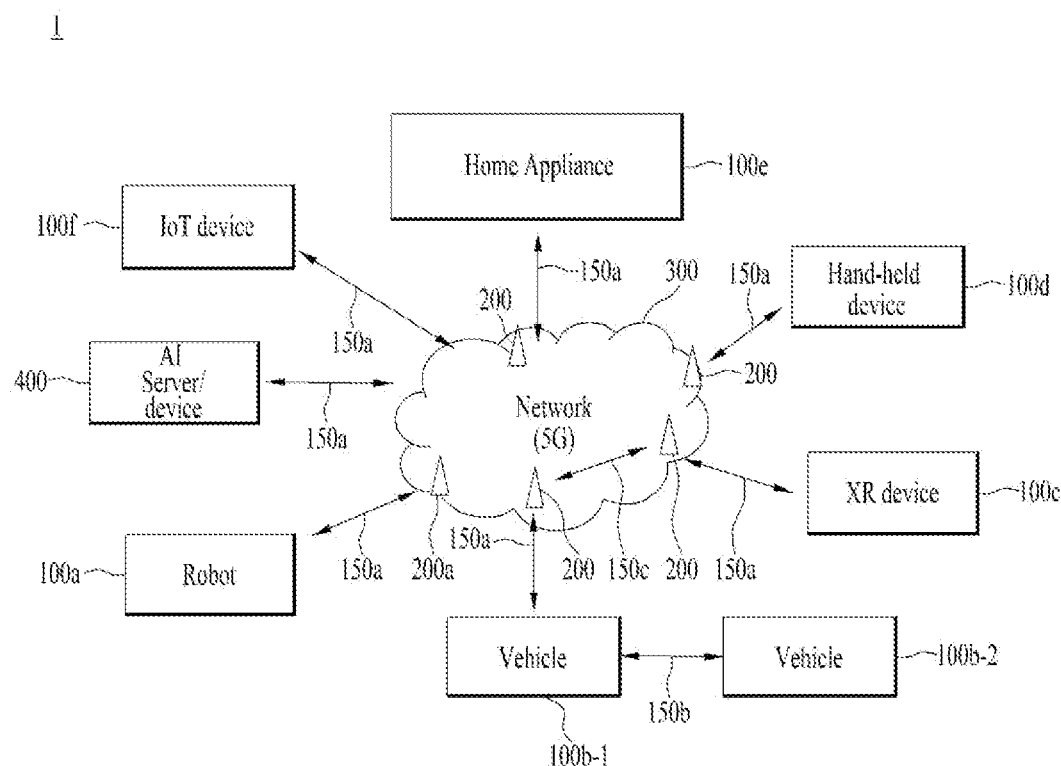
FIG. 16 illustrates a communication system applied to the present disclosure.

FIG. 16 illustrates a communication system applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 17:
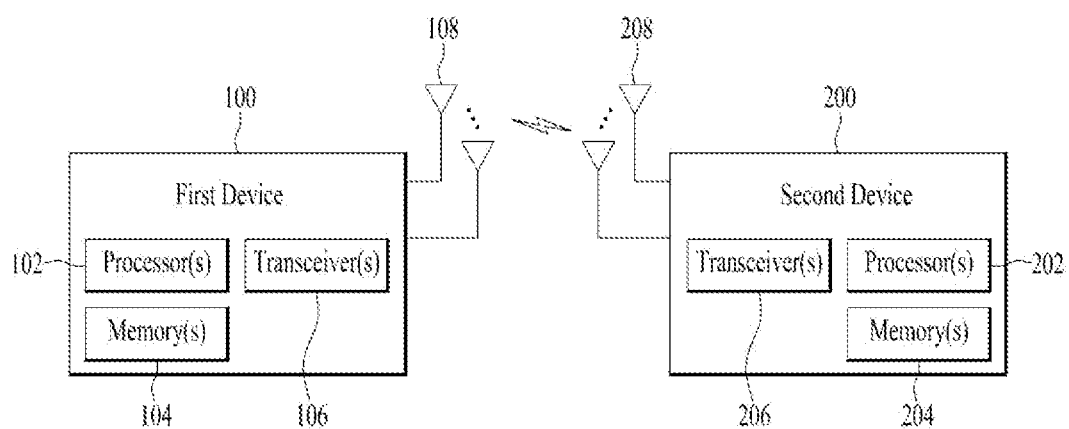
FIG. 17 illustrates wireless devices applicable to the present disclosure.

FIG. 17 illustrates a wireless device applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the first wireless device 100 or a first UE may include the processor(s) 102 connected to the RF transceiver and the memory(s) 104. The memory(s) 104 may include at least one program for performing operations related to the embodiments described above with reference to FIGS. 11 to 15. The processor(s) 102 may be configured to: randomly select a value of a back-off counter within a contention window related to an unlicensed band; and control the RF transceiver to transmit a first SL signal including a TB in the unlicensed band based on the backoff counter. In this case, the first SL signal may be transmitted over a PSSCH or a PSCCH. Based on that reception of HARQ feedback for the first SL signal is not expected, a size of the contention window may be maintained regardless of whether the TB is retransmitted.

Alternatively, a chipset including the processor(s) 102 and the memory(s) 104 may be configured. The chipset may include: at least one processor; and at least one memory operably connected to the at least one processor and configured to, when executed, cause the at least one processor to perform operations. The operations may include: randomly selecting a value of a back-off counter within a contention window related to an unlicensed band; and transmitting a first SL signal including a TB in the unlicensed band based on the backoff counter. In this case, the first SL signal may include a PSSCH or a PSCCH. Based on that reception of HARQ feedback for the first SL signal is not expected, a size of the contention window may be maintained regardless of whether the TB is retransmitted. In addition, the operations may include the operations described in FIGS. 11 to 15 based on the program included in the memory(s) 104.

Alternatively, there is provided a computer-readable storage medium including at least one computer program configured to cause at least one processor to perform operations. The operations may include: randomly selecting a value of a back-off counter within a contention window related to an unlicensed band; and transmitting a first SL signal including a TB in the unlicensed band based on the backoff counter. In this case, the first SL signal may include a PSSCH or a PSCCH. Based on that reception of HARQ feedback for the first SL signal is not expected, a size of the contention window may be maintained regardless of whether the TB is retransmitted.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 18:
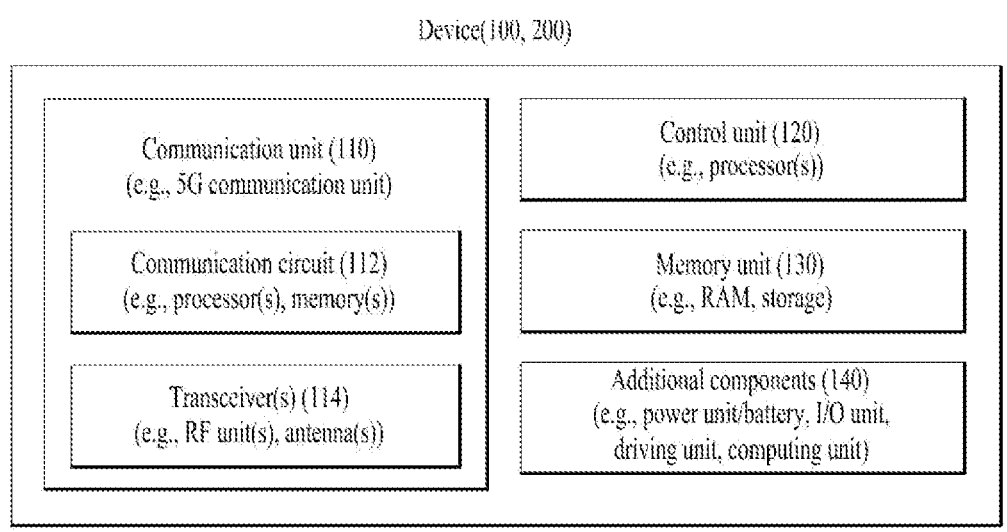
FIG. 18 illustrates another example of a wireless device to which the present disclosure is applied.

FIG. 18 illustrates another example of a wireless device applied to the present disclosure. The wireless device may be implemented in various forms according to a use-case/service (refer to FIG. 16)

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 19:
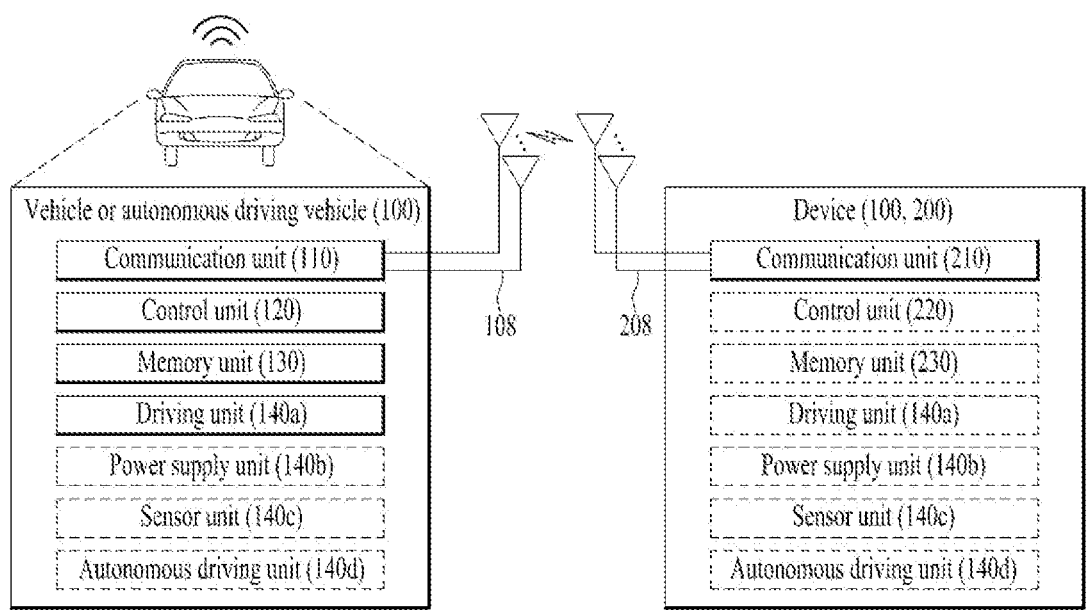
FIG. 19 illustrates a vehicle or an autonomous driving vehicle applied to the present disclosure.

Examples of Vehicles or Autonomous Vehicles to which the Present Disclosure is Applied FIG. 19 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As is apparent from the above description, the present disclosure has effects as follows.

According to various embodiments, smooth sidelink communication in an unlicensed band may be guaranteed by adjusting the size of a contention window in the unlicensed band in consideration of the following characteristics of the sidelink communication: initial transmission and retransmission of a TB are performed regardless of HARQ feedback.

In addition, conditions for maintaining the size of the contention window in the unlicensed band even when the TB is retransmitted may be preconfigured in consideration of the characteristics of HARQ feedback in the sidelink communication, thereby minimizing an unnecessary increase in the size of the contention window in the sidelink communication.

Further, the size of the contention window may be adjusted in consideration of the characteristics of the sidelink communication, thereby improving the efficiency of use of resources related to sidelink signal transmission and reception in the unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

What is claimed is:

1. A method of transmitting, by a first user equipment (UE), sidelink signals in an unlicensed band in a wireless communication system supporting sidelink communication, the method comprising:
   randomly selecting a value of a back-off counter within a contention window related to the unlicensed band; and
   transmitting a first sidelink signal including a transport block (TB) in the unlicensed band based on the backoff counter,
   wherein the first sidelink signal is transmitted over a physical sidelink shared channel (PSSCH) or a physical sidelink control channel (PSCCH), and
   wherein based on that reception of hybrid automatic repeat request (HARQ) feedback for the first sidelink signal is not expected, a size of the contention window is maintained regardless of whether the TB is retransmitted.

2. The method of claim 1, wherein based on that only the first sidelink signal for which the HARQ feedback is disabled is transmitted during a first duration, the size of the contention window is maintained although the TB is retransmitted.

3. The method of claim 2, wherein the first duration is a reference duration corresponding to channel occupancy for the unlicensed band after a last update of the size of the contention window.

4. The method of claim 3, wherein the reference duration is a duration between a start of the channel occupancy and an end of a first slot in which the first sidelink signal is transmitted.

5. The method of claim 1, wherein based on that the first sidelink signal for which the reception of the HARQ feedback is not expected has a specific cast type, the size of the contention window is maintained regardless of whether the TB is retransmitted, and
   wherein the specific cast type is broadcast or groupcast.

6. The method of claim 1, wherein the first UE is configured to determine whether the reception of the HARQ feedback is expected after a last update of the contention window.

7. The method of claim 1, wherein the contention window is configured for each of priority classes related to channel access in the unlicensed band.

8. The method of claim 7, wherein based on that the reception of the HARQ feedback for the first sidelink signal is not expected, the first UE is configured to maintain the size of the contention window for all of the priority classes.

9. The method of claim 2, wherein a length of the first duration is configured for each packet priority related to the sidelink signals or each resource pool related to the sidelink signals.

10. A first user equipment (UE) configured to transmit sidelink signals in an unlicensed band in a wireless communication system supporting sidelink communication, the first UE comprising:
    a radio frequency (RF) transceiver; and
    a processor connected to the RF transceiver,
    wherein the processor is configured to:
    randomly select a value of a back-off counter within a contention window related to the unlicensed band; and
    control the RF transceiver to transmit a first sidelink signal including a transport block (TB) in the unlicensed band based on the backoff counter,
    wherein the first sidelink signal comprises a physical sidelink shared channel (PSSCH) or a physical sidelink control channel (PSCCH), and
    wherein based on that reception of hybrid automatic repeat request (HARQ) feedback for the first sidelink signal is not expected, a size of the contention window is maintained regardless of whether the TB is retransmitted.

11. The first UE of claim 10, wherein based on that only the first sidelink signal for which the HARQ feedback is disabled is transmitted during a first duration, the size of the contention window is maintained although the TB is retransmitted.

12. The first UE of claim 11, wherein the first duration is a reference duration corresponding to channel occupancy for the unlicensed band after a last update of the size of the contention window.

13. The first UE of claim 12, wherein based on that the first sidelink signal for which the reception of the HARQ feedback is not expected has a specific cast type, the size of the contention window is maintained regardless of whether the TB is retransmitted, and
    wherein the specific cast type is broadcast or groupcast.

14. A chipset configured to transmit sidelink signals in an unlicensed band in a wireless communication system supporting sidelink communication, the chipset comprising:
    at least one processor; and
    at least one memory operably connected to the at least one processor and configured to, when executed, cause the at least one processor to perform operations comprising:
    randomly selecting a value of a back-off counter within a contention window related to the unlicensed band; and
    transmitting a first sidelink signal including a transport block (TB) in the unlicensed band based on the backoff counter, wherein the first sidelink signal comprises a physical sidelink shared channel (PSSCH) or a physical sidelink control channel (PSCCH), and wherein based on that reception of hybrid automatic repeat request (HARQ) feedback for the first sidelink signal is not expected, a size of the contention window is maintained regardless of whether the TB is retransmitted.

\* \* \* \* \*